United States Patent
Ishikawa et al.

(10) Patent No.: US 9,524,237 B2
(45) Date of Patent: Dec. 20, 2016

(54) DATA PROCESSING DEVICE AND SEMICONDUCTOR INTERGRATED CIRCUIT DEVICE FOR A BI-ENDIAN SYSTEM

(75) Inventors: Naoshi Ishikawa, Kanagawa (JP); Seiji Ikari, Tokyo (JP); Hiromi Nagayama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 807 days.

(21) Appl. No.: 13/063,347

(22) PCT Filed: May 28, 2009

(86) PCT No.: PCT/JP2009/059738
§ 371 (c)(1),
(2), (4) Date: Mar. 10, 2011

(87) PCT Pub. No.: WO2010/029794
PCT Pub. Date: Mar. 18, 2010

(65) Prior Publication Data
US 2011/0191569 A1    Aug. 4, 2011

(30) Foreign Application Priority Data
Sep. 12, 2008  (JP) ................ 2008-234768

(51) Int. Cl.
*G06F 12/04* (2006.01)
*G06F 9/30* (2006.01)

(52) U.S. Cl.
CPC .......... *G06F 12/04* (2013.01); *G06F 9/30025* (2013.01)

(58) Field of Classification Search
CPC ................................................ G06F 13/4013
(Continued)

(56) References Cited

U.S. PATENT DOCUMENTS 5,627,975 A * 5/1997 Bryant et al. ................. 710/307
5,687,337 A * 11/1997 Carnevale et al. ........... 712/204
(Continued)

FOREIGN PATENT DOCUMENTS

JP      63-211019     9/1988
JP       3-36643     2/1991
(Continued)

OTHER PUBLICATIONS

Motorola, "PowerPC Microprocessor Family: The Programming Environments for 32-bit Microprocessors", Jan. 1997, MPCFPE32B/AD Rev. 1, Chapter 6.2, 21 pages.*
(Continued)

*Primary Examiner* — Eric Coleman
(74) *Attorney, Agent, or Firm* — McDermott Will & Emery LLP

(57) ABSTRACT

The present invention provides a data processing device where a program can be commonly used and a vector table can be shared regardless of types of endian in a bi-endian system. An instruction is fixed to little endian, and endian of data to be used for executing the instruction is variable. A size of the respective vector addresses in the vector table is 32 bits, and the number of bits at the time of a data access is maximally 32 bits. A CPU fetches an instruction, and before the fetched instruction is executed, the CPU accesses to, for example, for 32-bit data in a memory. At this time, the CPU controls the aligner so that addresses and alignments of data to be stored in each address in byte unit in a data register are identical to addresses and alignments of data determined by little endian of an instruction without depending on types of the endian of the data.

5 Claims, 36 Drawing Sheets

(58) Field of Classification Search
 USPC .......................................................... 712/204
 See application file for complete search history.

(56) References Cited

U.S. PATENT DOCUMENTS

| | | | |
|---|---|---|---|
| 5,961,640 A * | 10/1999 | Chambers et al. | ............ 712/300 |
| 2004/0221173 A1* | 11/2004 | Moyer et al. | ................. 713/200 |
| 2005/0125647 A1 | 6/2005 | Symes et al. | |
| 2008/0028197 A1* | 1/2008 | Sawai | ........................... 712/300 |
| 2008/0040576 A1 | 2/2008 | Stempel et al. | |
| 2008/0114969 A1* | 5/2008 | Gonion et al. | ................ 712/223 |

FOREIGN PATENT DOCUMENTS

| | | |
|---|---|---|
| JP | 6-124201 | 5/1994 |
| JP | 8-278918 | 10/1996 |
| JP | 9-97211 | 4/1997 |
| JP | 2000-3304 | 1/2000 |
| JP | 2000-82009 | 3/2000 |
| JP | 2000-235503 | 8/2000 |
| JP | 2005-174296 | 6/2005 |

OTHER PUBLICATIONS

"Rerate." http://oxforddictionaries.com/. retrieved Jul. 15, 2013 from <http://web.archive.org/web/20130715234705/http://oxford-dictionaries.com/us/definition/american_english/rerate>.*

Office Action issued in Japanese Patent Application No. 2010-528678 dated Feb. 5, 2013 (with partial English translation).

Chinese Office Action issued in Chinese Application No. 200980135616.7 dated Apr. 22, 2014, w/Partial English translation.

* cited by examiner

F I G . 4
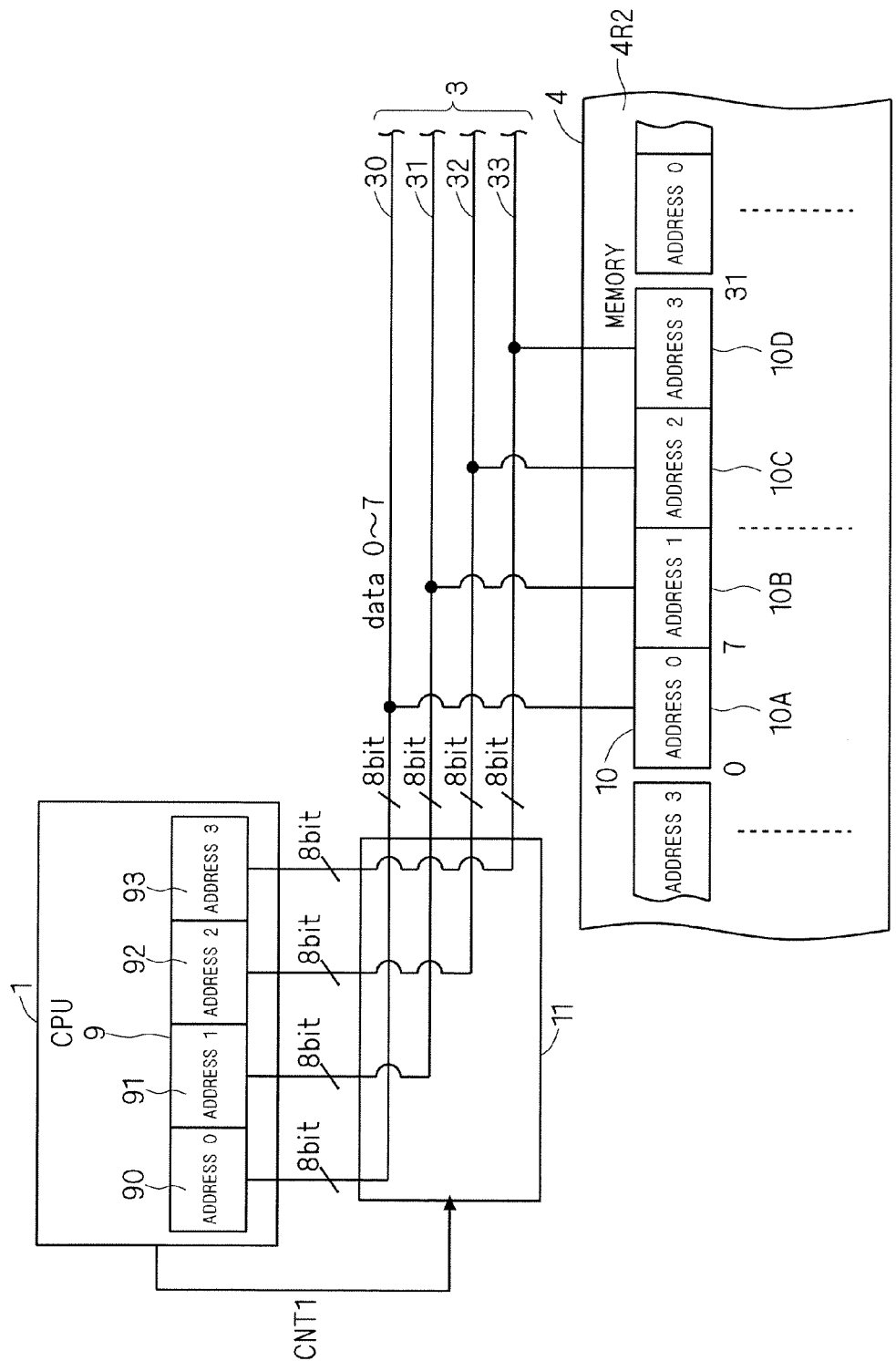

FIG. 5
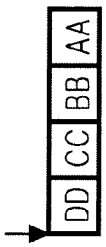

F I G . 6
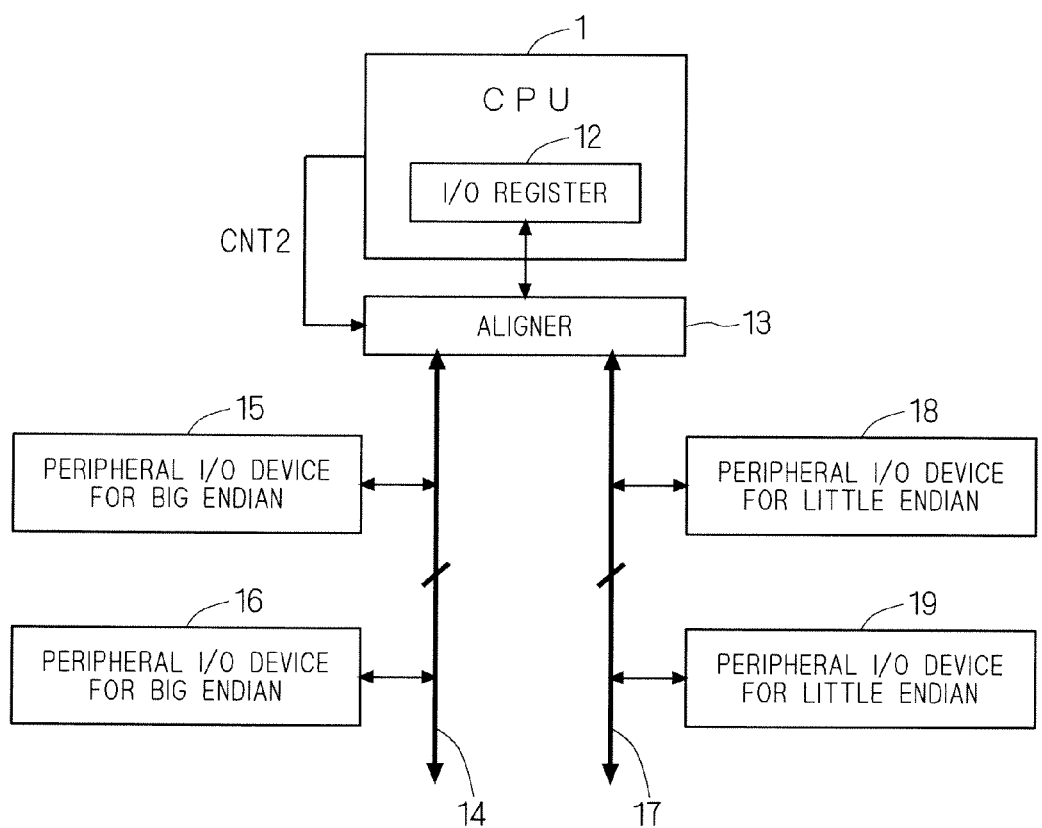

F I G . 7
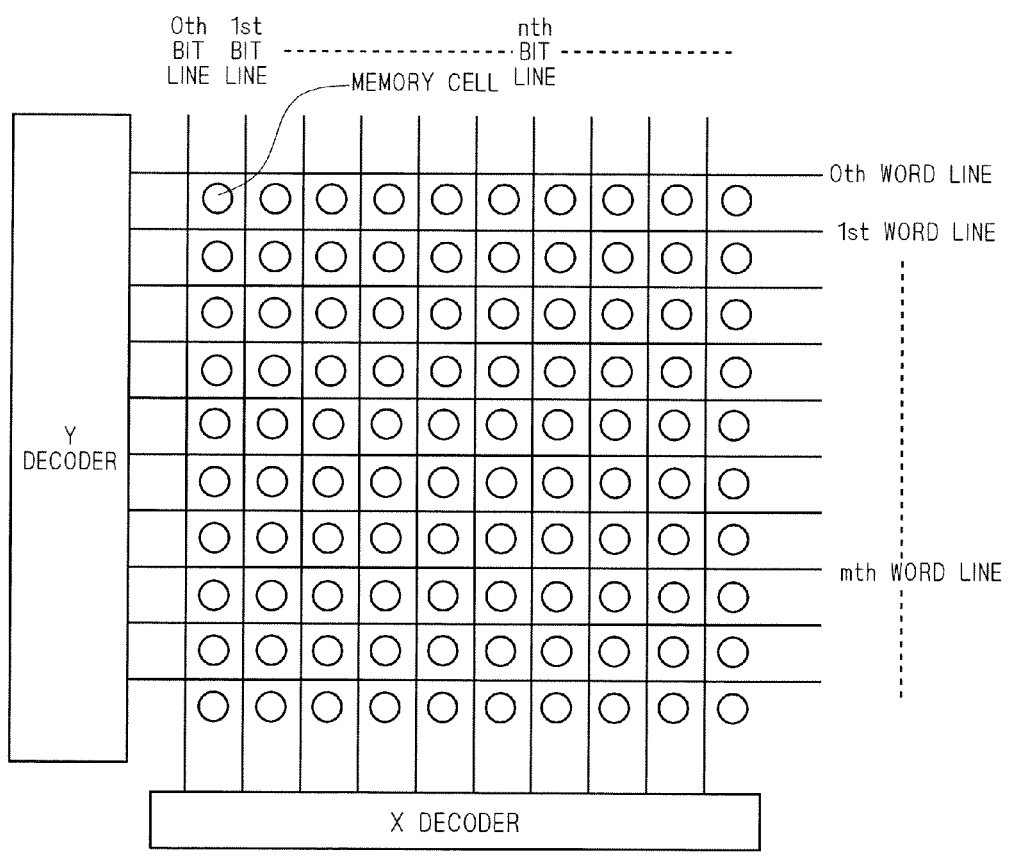

F I G . 8
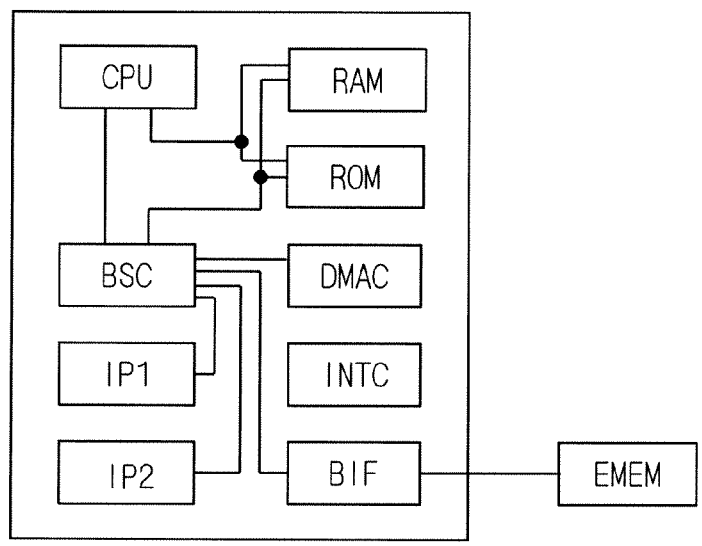
F I G . 9
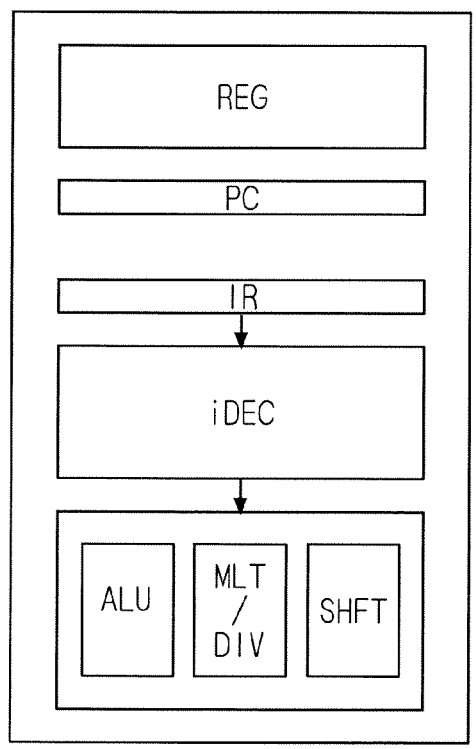

F I G . 1 3
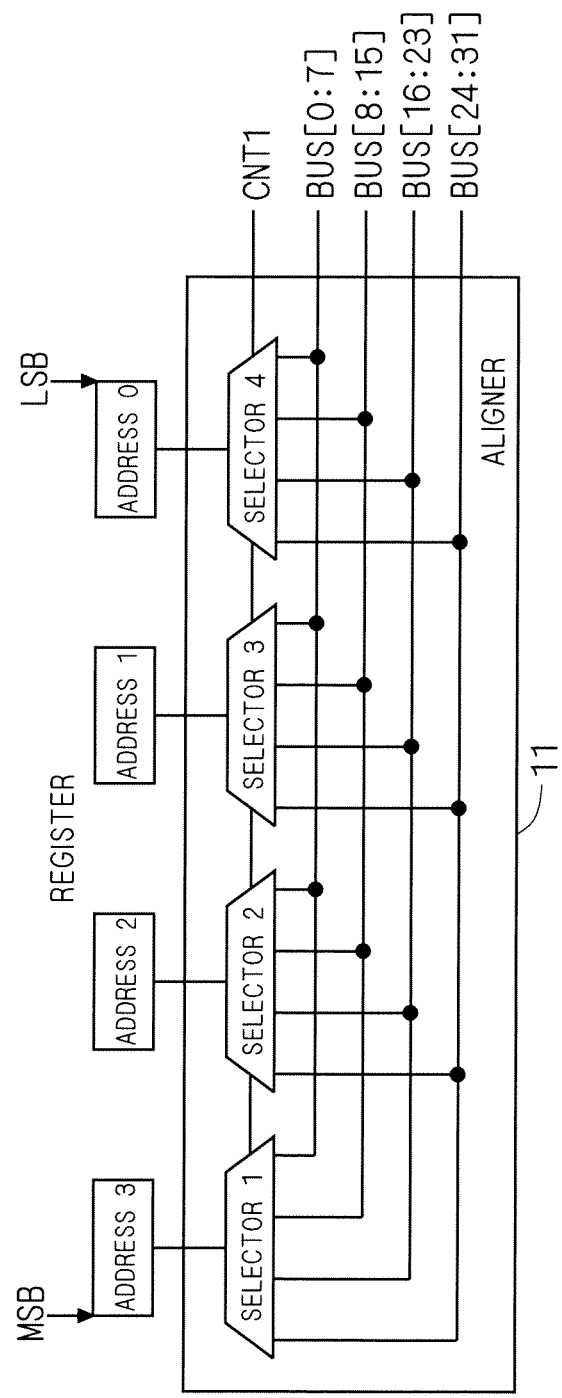

F I G . 1 4
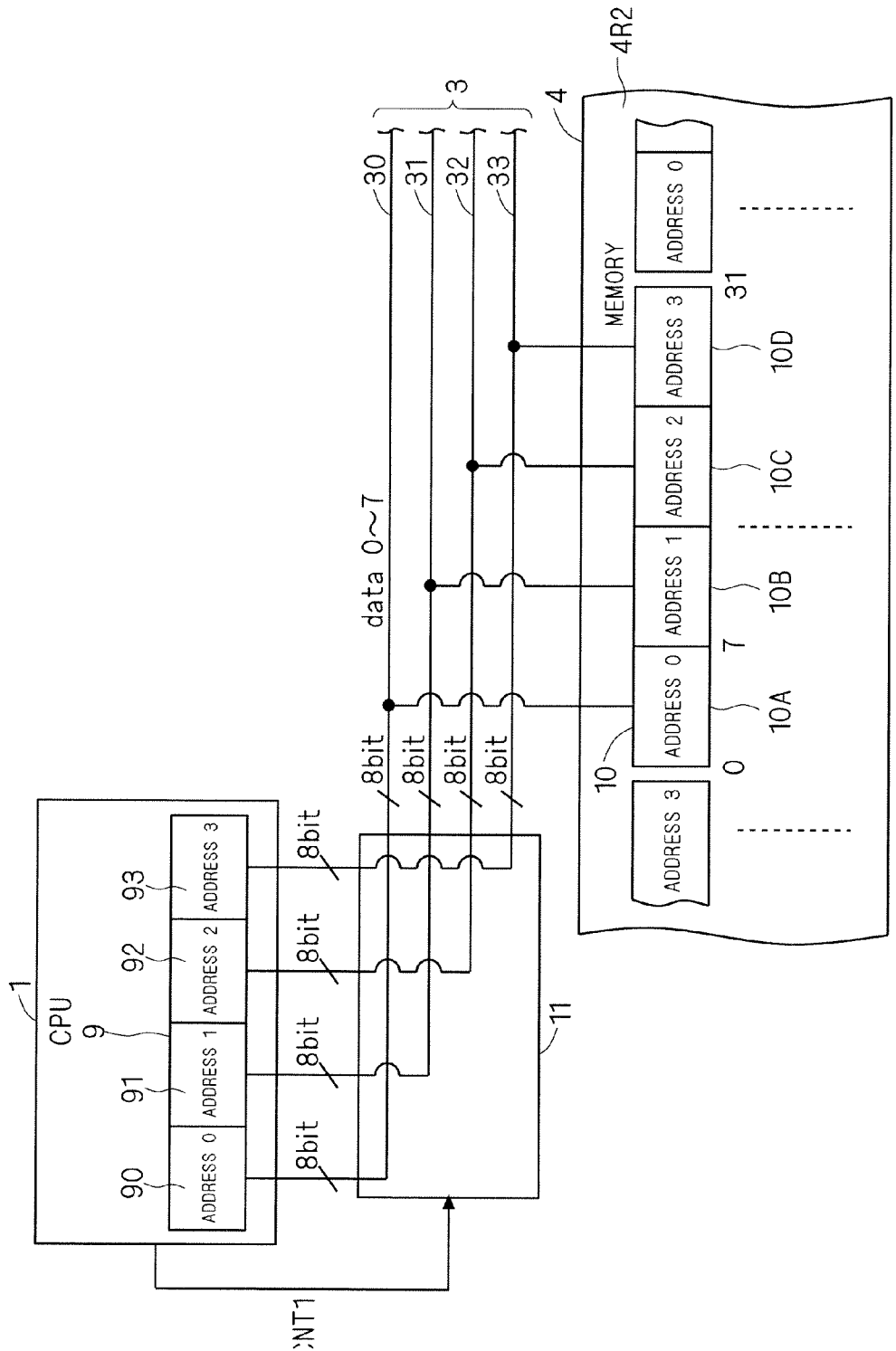

F I G . 1 5
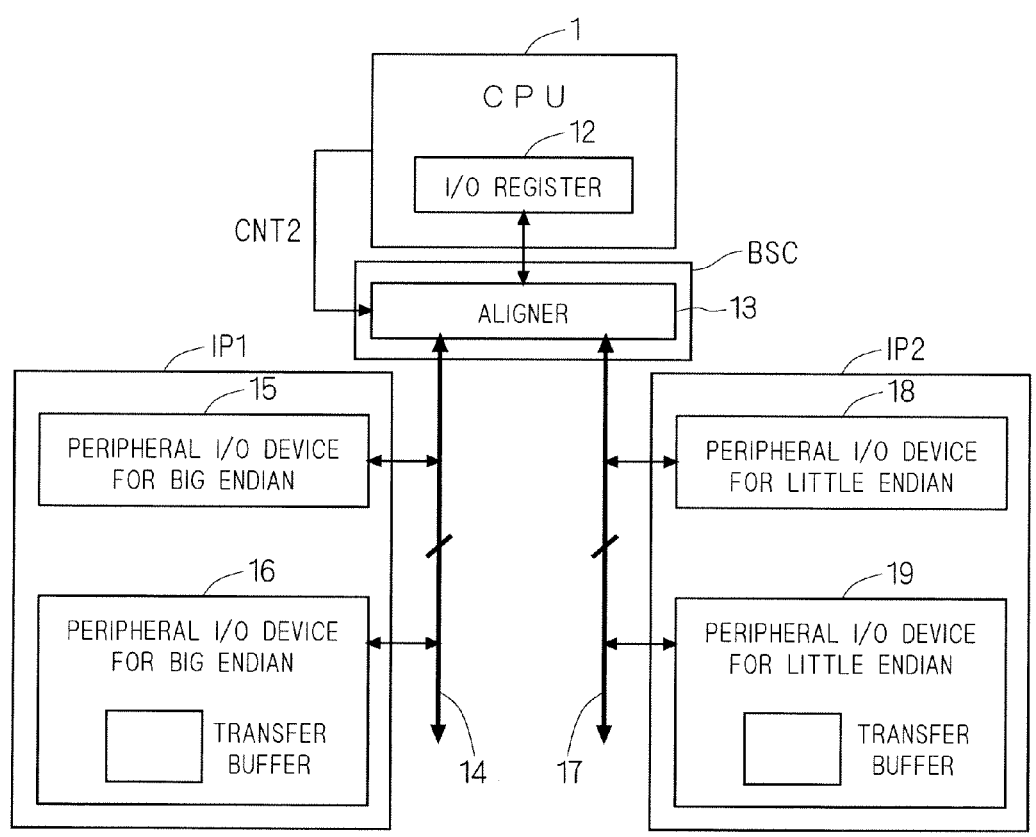

F I G . 1 7
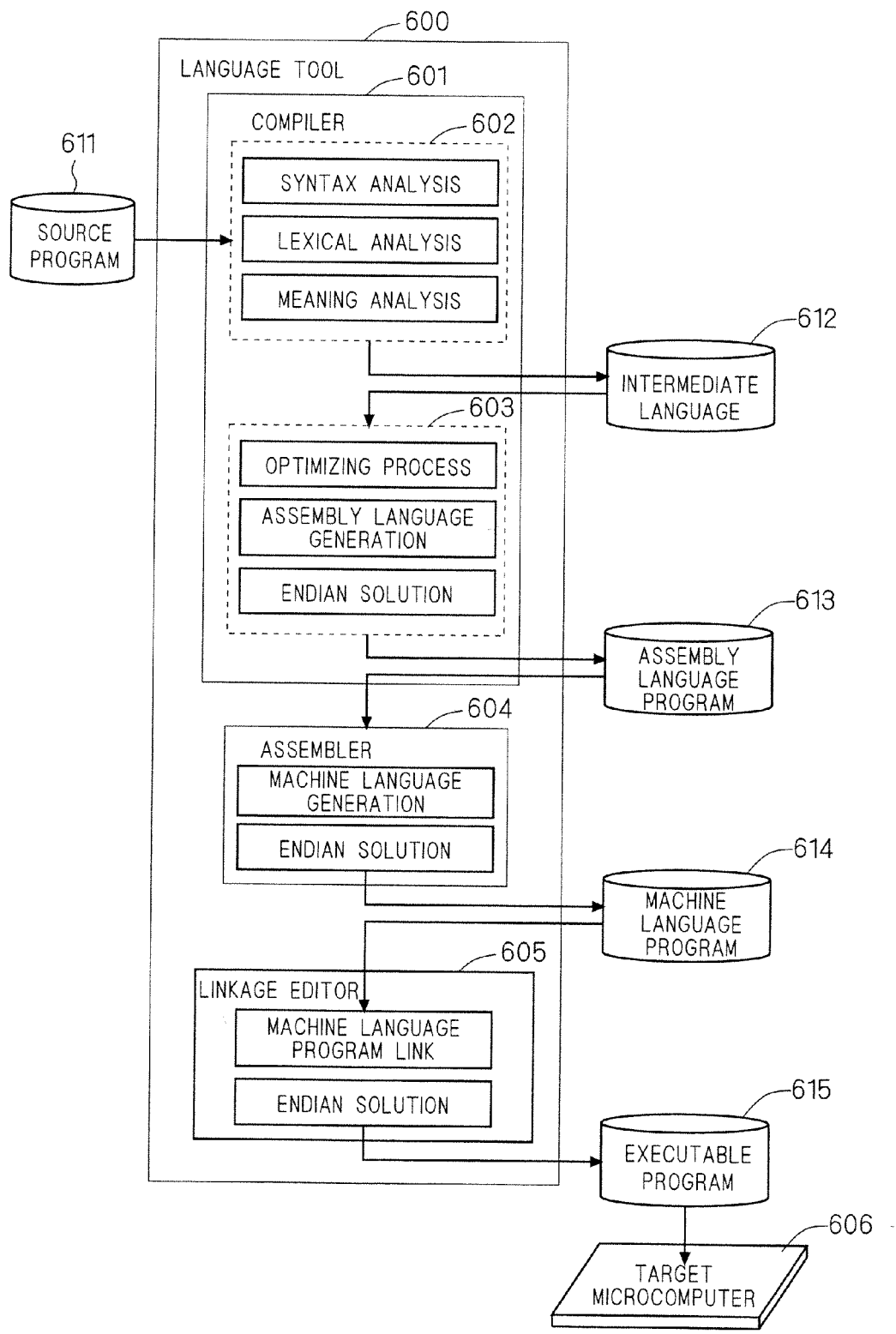

FIG. 18

| CPU | | COMPARED TO THE PAST | DESIGN TARGET |
|---|---|---|---|
| MAXIMUM OPERATION FREQUENCY (MHz) | → BASIC PERFORMANCE AND CODE EFFICIENCY ARE IMPROVED | QUINTUPLE | 200MHz |
| PROCESSING PERFORMANCE (MIPS/MHz) | | DOUBLE | 1.25MIPS/MHz |
| CODE EFFICIENCY IS IMPROVED | | IMPROVED BY 30% | |
| LOW POWER CONSUMPTION (CPU CURRENT mA/MHz) | | 1/3 | 0.03mA/MHz |
| HIGH INTEGRATION (FLASH MEMORY MAXIMUM CAPACITY) | | QUADRUPLE | 4MB |

FIG. 22
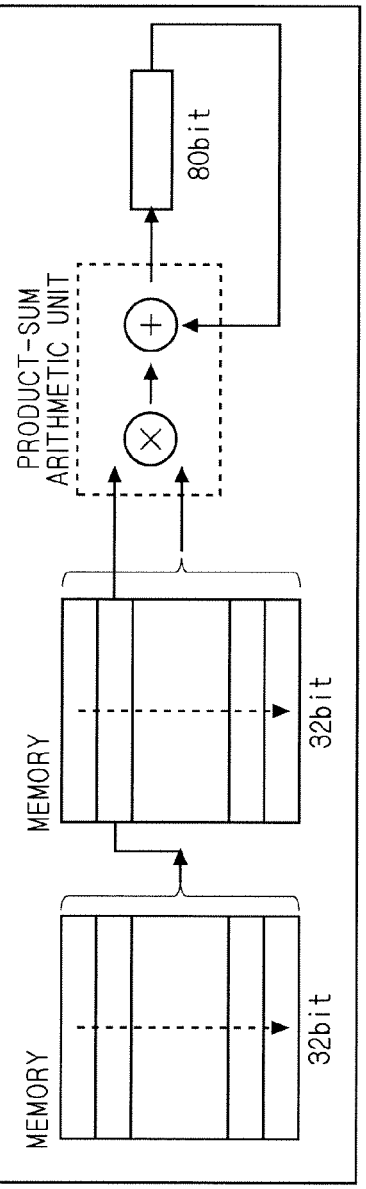
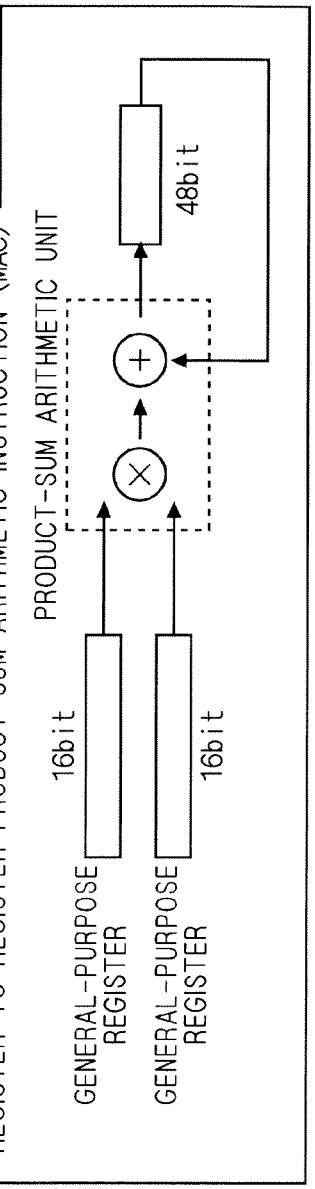

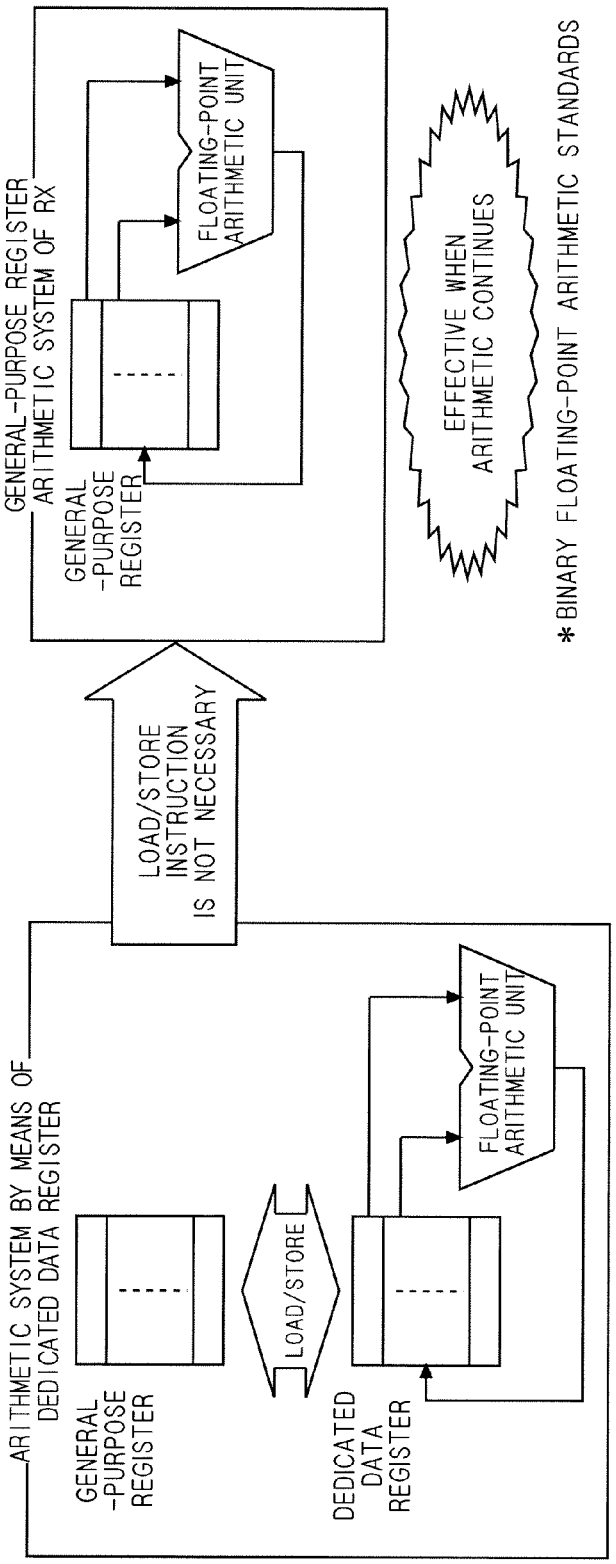

FIG. 24

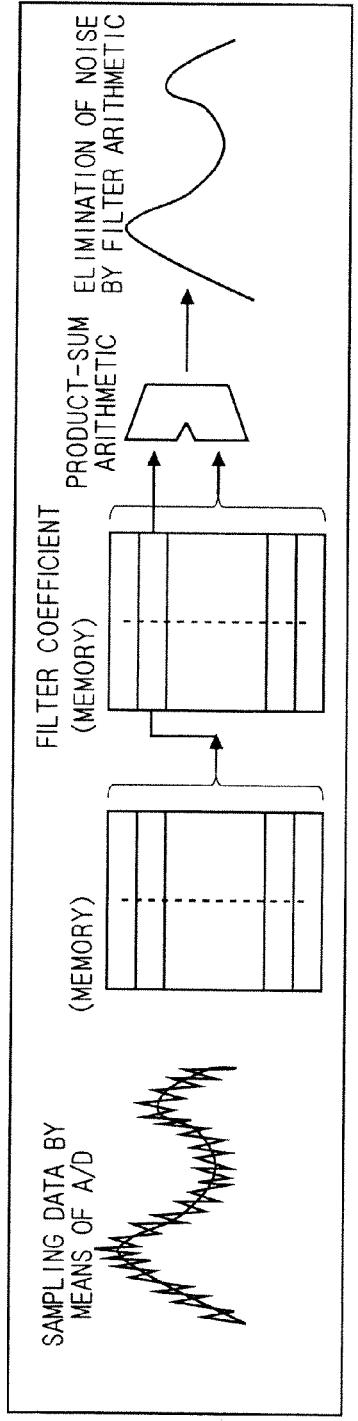
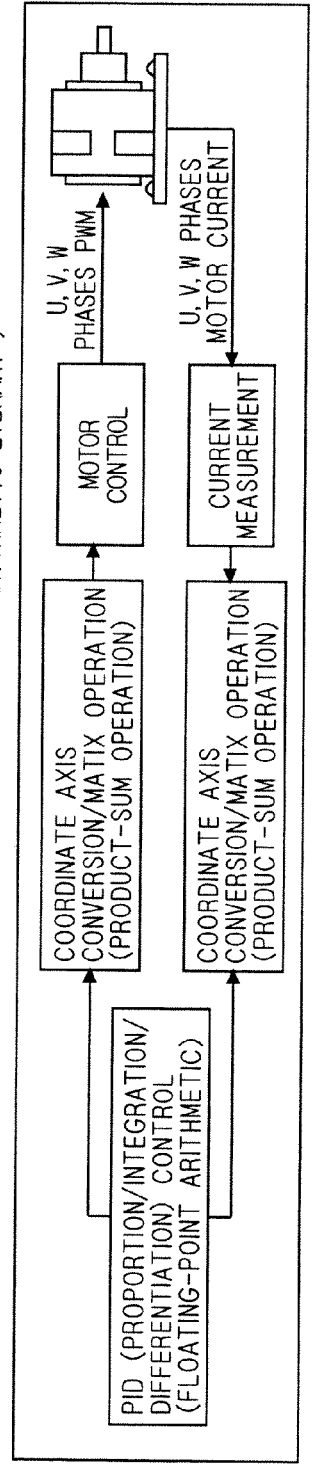

- MEMORY-TO-MEMORY PRODUCT-SUM ARITHMETIC INSTRUCTION (RMPA) IS OPTIMAL FOR SPEEDING-UP AND HIGH ACCURACY OF FILTER ARITHMETIC

- REGISTER-TO-REGISTER PRODUCT-SUM ARITHMETIC INSTRUCTION (MAC) IS OPTIMUM FOR MATRIX OPERATION SUCH AS COORDINATE AXIS CONVERSION

- FLOATING POINT ARITHMETIC UNIT OF GENERAL-PURPOSE REGISTER ARITHMETIC SYSTEM IS OPTIMUM FOR PID CONTROL WHERE DIVISION/MULTIPLICATION ARITHMETIC CONTINUES (SPEED IS HIGHER THAN THAT IN THE DEDICATED REGISTER ARITHMETIC SYSTEM AND POINT ARITHMETIC LIBRARY*)

*EMULATION BY MEANS OF INTEGER ARITHMETIC UNIT

FIG. 26

1-BYTE INSTRUCTION (HIGHLY-FREQUENT "CONDITION BRANCH" IS ARRANGED)

RELATIVE CONDITIONAL BRANCH : BEQ*1, BNE*1
RELATIVE UNCONDITIONAL BRANCH : BRA

2-BYTE INSTRUCTION (HIGHLY-FREQUENT "TRANSFER" AND "COMPARE" ARE ARRANGED)

TRANSFER : MOV(REGISTER-TO-REGISTER TRANSFER,
  MEMORY-TO-MEMORY TRANSFER*2, LOAD*2, STORE*2)
COMPARISON : CMP(REGISTER-TO-REGISTER COMPARISON, IMMEDIATE VALUE ←→ REGISTER-TO-REGISTER COMPARISON)
ADDITION : ADD(REGISTER + REGISTER, IMMEDIATE VALUE + REGISTER)
SUBROUTINE BRANCH : BSR
MULTIPLICATION : MUL(REGISTER × REGISTER)

3-BYTE INSTRUCTION (INSTRUCTION OF CONTROL SYSTEM ARITHMETIC IS ARRANGED)

DIVISION : DIV(REGISTER ÷ REGISTER)
PRODUCT-SUM : MAC(REGISTER × REGISTER)
FLOATING-POINT ADDITION : FADD(REGISTER + REGISTER)
FLOATING-POINT MULTIPLICATION : FMUL(REGISTER × REGISTER)

*1: FORWARD RELATIVITY OF 3 BITS      *2: MEMORY ACCESS IS REGISTER INDIRECT

FIG. 27
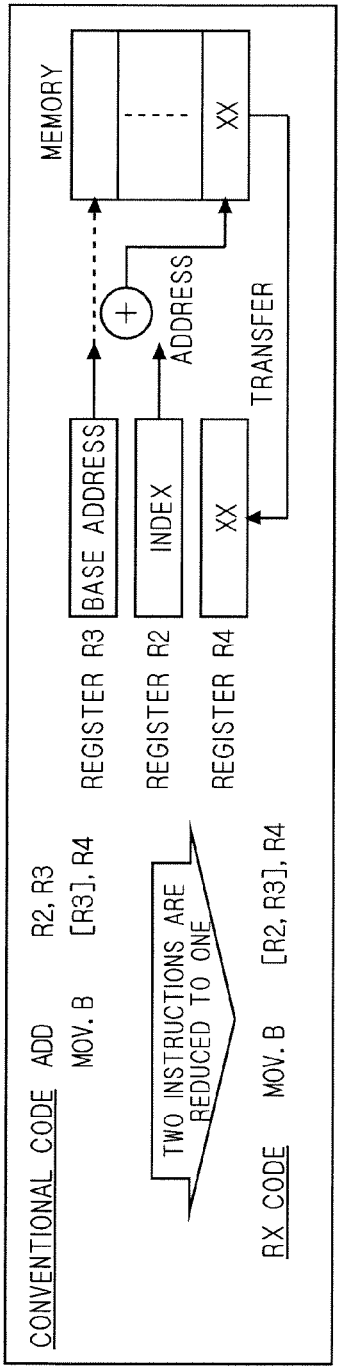
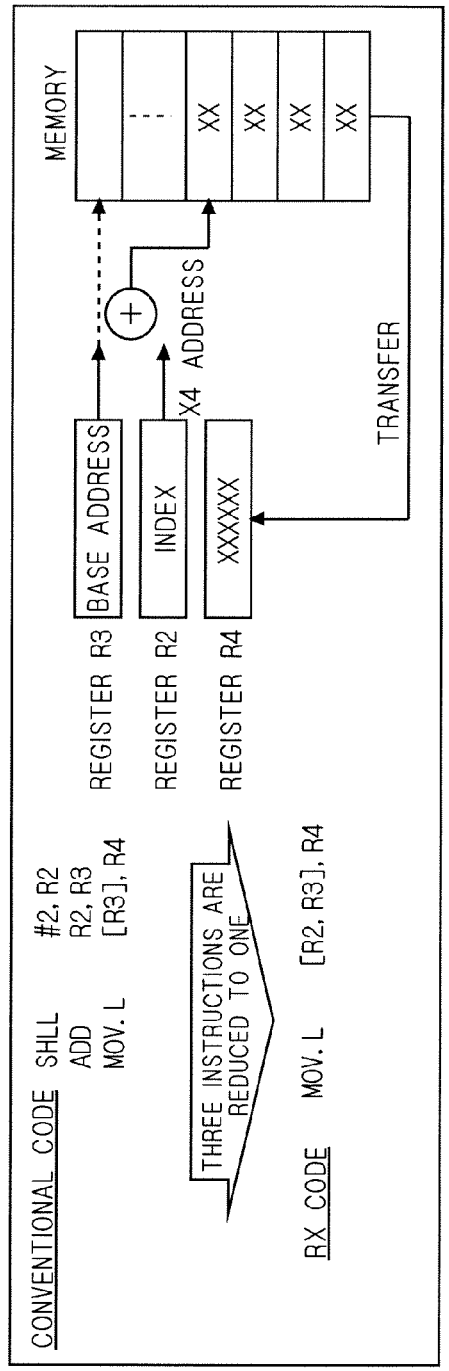

FIG. 28
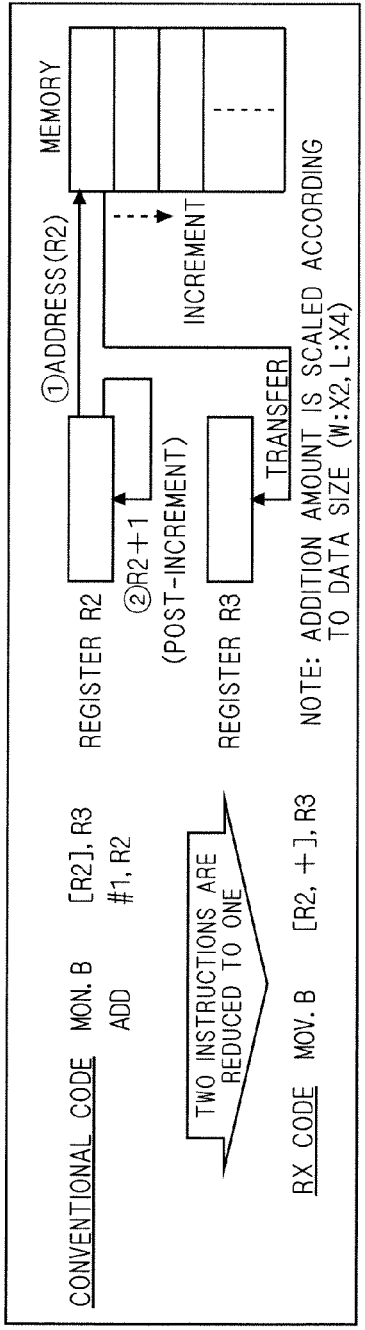
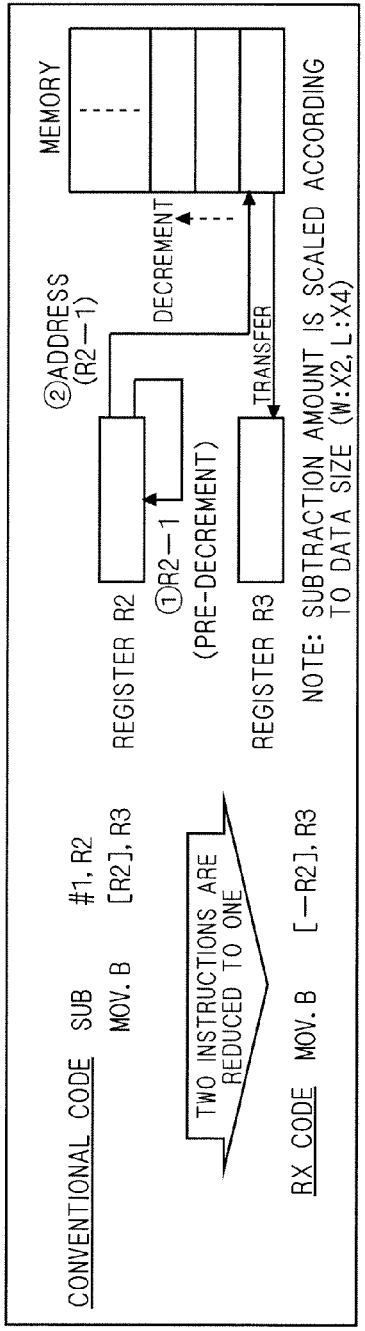

F I G. 35
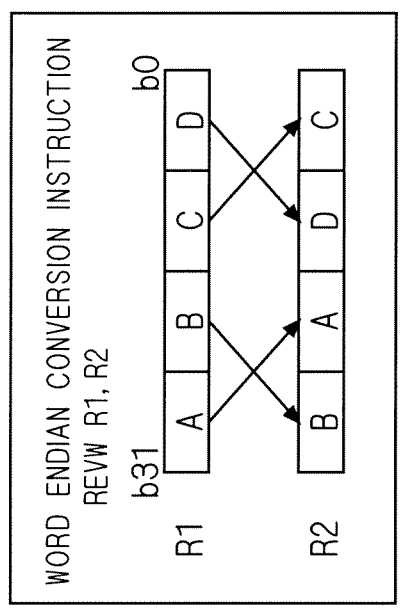
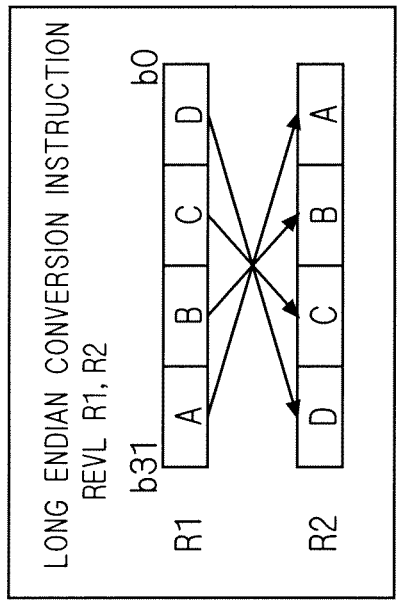

F I G . 3 7
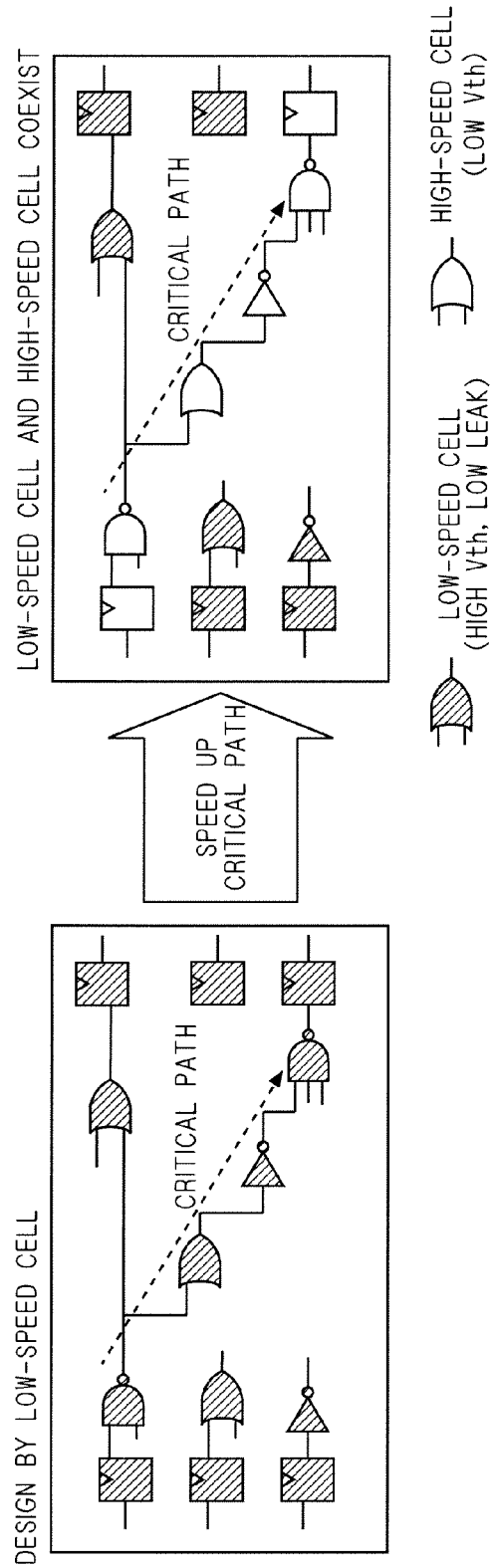

DATA PROCESSING DEVICE AND SEMICONDUCTOR INTERGRATED CIRCUIT DEVICE FOR A BI-ENDIAN SYSTEM

RELATED APPLICATIONS

This application is the U.S. National Phase under 35 U.S.C. §371 of International Application No. PCT/JP2009/059738, filed on May 28, 2009, which in turn claims the benefit of Japanese Application No. 2008-234768, filed on Sep. 12, 2008, the disclosures of which Applications are incorporated by reference herein.

TECHNICAL FIELD

The present invention relates to a data processing device having a processor.

BACKGROUND ART

In data processing device having processors such as CPU (Central

Processing Unit) or DSP (Digital Signal Processor), for example, semiconductor integrated circuit devices that are called as so-called microcomputers (also referred to as microprocessors, micro-controllers or micoms), data sequence of binary information includes data sequence called as little endian and data sequence called as big endian.

Binary information treated by microcomputers includes binary information that is processed as an instruction for controlling an operation of a microcomputer and binary information as data to be processed by execution of the instruction, in a certain microcomputer, both the instruction and the data are generally subject to data process by adopting any one of little endian or big endian.

On the other hand, Patent Document 1 describes a microcomputer that is compatible with both the little endian and the big endian as endian of the instruction and endian of the data in the microcomputer, Patent Document 2 describes a microcomputer where endian of data to be processed by the microcomputer can be changed between little endian and big endian.

The microcomputer described in Patent Document 2 is constituted so that data sequence is changed in byte unit according to whether stored data has little endian or big endian and the data can be processed in the case of any endian.

In the microcomputer, a reduction of a memory capacity required for storing instructions and data and an improvement of an execution efficiency of instruction/a processing efficiency of data by suitable power consumption is required.

RELATED ART DOCUMENTS

Patent Documents

Patent Document 1: Japanese Patent Application Laid-Open No. 2000-082009
Patent Document 2: Japanese Patent Application Laid-Open No. 2005-174296

SUMMARY OF THE INVENTION

Problem to be Solved by the Invention

At the present, in development of data processing device (hereinafter, simply referred to as microcomputers) having a processor such as CPU (when description about a function is discriminated from description about a physical domain to be formed on a semiconductor, CPU is described for the former case, and a CPU core is described for the latter case, and when discrimination is not necessary, CPU is described) or DSP, various peripheral function blocks (referred to as peripheral function IPs or peripheral function IP cores) as well as the CPU core are configured on a semiconductor substrate, and the various peripheral function blocks as well as a function of the CPU are operated under the control of CPU so that a process according to one object is executed. In this case, necessary periphery function blocks are purchased from companies called as so-called IP core vendors that specialize in developing designs of specified peripheral function blocks, or peripheral function blocks that have been designed by its own company in the past or is designed as another products are used to be configured on one semiconductor substrate, so that a target microcomputer is started to be designed and developed.

In such a design and development system of microcomputers, endian of data of the peripheral function blocks purchased or designed by its own company might be different from endian of the CPU, and each endian of each peripheral function block that should be cooperative with each other might be different.

In a conventional manner, when such a difference is generated among each endian, a peripheral function block that matches with the endian of the CPU is selected, or a peripheral functional block is redesigned so as to match with the endian of the CPU.

In view of the development system of such a microcomputer, the inventors of this application have recognized that entire processing performances of the CPU and the microcomputer are deteriorated particularly in endian conversion described in Patent Document 2.

One object of the present invention is to provide a microcomputer that performs preferable endian conversion.

Another object of the present invention is to provide a data processing device of a bi-endian system in which the CPU can use a common program and a common vector address without depending on types of endian.

Means for Solving the Problem

As to data to be processed by the CPU, any one of little endian and big endian can be selected. When data is transferred between the CPU and a memory, sequences of the data transfer in size of a vector addresses of the CPU are allowed to match with each other in any case of little endian and big endian.

Use of the same program is enabled by fixing endian of an instruction code, endian of data is made to be variable, and in this case, where each vector address in a vector table is N bits, when an access to data of N-bit size that are aligned into N bits is executed, a control is made so that the access is enabled at the same address/the same alignment without depending on endian even in both cases where the endian of the data is big endian or little endian. On the other hand, when the CPU accesses to a memory with data whose unit is different from the N bits, a mechanism for changing an address and an alignment of data obtained from the memory so that the address and the alignment match with an address and an alignment of data to be stored in each address in byte unit of a data register in the CPU is provided.

Effect of the Invention

In data transfer with vector size, the data transfer is enabled in the same data order without relying on the endian of the data, so that a vector address can be shared.

In the data processing device that adopts the bi-endian system where endian of an instruction is fixed, a program can be commonly used, and a vector table can be shared.

Various concretizations of the present invention as well as its effects and advantages are described in detail below with reference to accompanying drawings.

BRIEF DESCRIPTION OF THE DRAWINGS

FIG. 4 is a block diagram schematically illustrating a connecting relationship between each address of each register in the CPU and each address of each storage region in a memory in a case of 32-bit data access.

FIG. 5 is a diagram illustrating a byte order in the memory and the register at the time of reading data stored in a memory region and storing it in the register.

FIG. 6 is a block diagram schematically illustrating a connecting constitution between the CPU and a CPU peripheral I/O device according to an embodiment 2.

FIG. 7 is a diagram schematically illustrating a constitution of a memory.

FIG. 8 is a diagram illustrating a schematic constitution of the microcomputer.

FIG. 9 is a diagram illustrating a schematic constitution of the CPU.

FIG. 13 is a is a diagram illustrating one example of an aligner.

FIG. 14 is a diagram illustrating one example of a connecting condition of the aligner at the time of data transfer in unit of an interrupt vector address.

FIG. 15 is a diagram illustrating a schematic constitution of the microcomputer having peripheral function blocks with different endian.

FIG. 17 is a diagram schematically illustrating a flow of a development tool of a program to be executed in the microcomputer.

FIG. 18 is a diagram illustrating examples of evaluation items relating to a processing performance of the microcomputer.

FIG. 22 is a diagram illustrating an arithmetic example using a product-sum arithmetic unit.

FIG. 23 is a diagram illustrating an arithmetic example using a floating-point arithmetic unit.

FIG. 24 is a diagram illustrating another arithmetic example using the product-sum arithmetic unit and the floating-point arithmetic unit.

FIG. 26 is a diagram illustrating one example of an instruction whose size is reduced in instructions whose appearance frequency is high.

FIG. 27 is a diagram illustrating address arithmetic of register indirect addressing with index.

FIG. 28 is a diagram illustrating the address arithmetic of the register indirect addressing with post increment/pre-decrement function.

FIG. 35 is a diagram illustrating one example of an endian converting instruction.

FIG. 37 is a diagram illustrating an outline of a design of a timing violation solution in a critical path.

EMBODIMENTS FOR CARRYING OUT THE INVENTION (Embodiment 1)

Figure 1:
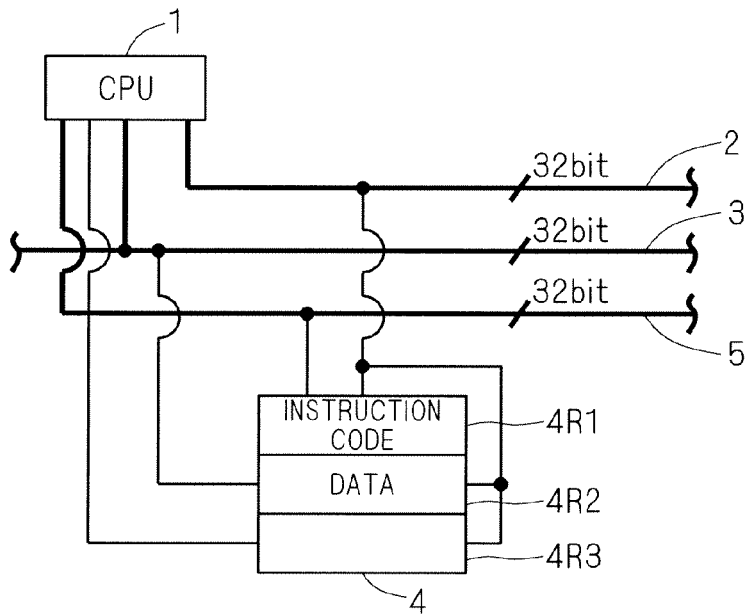
FIG. 1 is a block diagram illustrating a constitution of a part of a microcomputer according to an embodiment 1.

FIG. 1 is a block diagram illustrating a constitution of a part of a microcomputer according to an embodiment. In FIG. 1, illustration of an aligner 11, described later, is omitted.

In FIG. 1, a memory 4 is a readable/writable storage medium, and is composed of a volatile memory such as SRAM or a nonvolatile memory such as a flash memory (one example of EEPROM), and is mounted onto a semiconductor chip where a CPU 1 is mounted. In another manner, the memory 4 may be mounted onto a semiconductor chip where the CPU 1 is not mounted. In another manner, the memory 4 may be preset outside the microcomputer like a USB memory, for example, and may be electrically connected to a system bus of the microcomputer, described later, via a connecting terminal such as a USB terminal.

The memory 4 has (1) a storage region 4R1 for storing an instruction code (hereinafter, simply referred to as "instruction"), (2) a storage region 4R2 for storing data to be used at the time of executing an instruction of a program, and (3) a storage region 4R3 for storing a signal of the other data.

In the embodiment, as one of characteristics, endian of the instruction is always fixed only to one of little endian or big endian. Therefore, endian of an instruction bus 5 that can be used only when the CPU 1 fetches an instruction is also always fixed only to one of little endian or big endian. In this example, the endian of the instruction is always fixed to little endian.

On the contrary, endian of the data to be used at the time of executing the instruction stored in the storage region 4R2, namely, the endian of a data bus 3 to be used when the CPU 1 performs a reading operation or a writing operation is variable, and can be set to any one of little endian or big endian.

In this embodiment, all bit amounts of signals transferrable via an address bus 2, the data bus 3 and the instruction bus 5 are 32 bits. Therefore, in an bi-endian system in which data as a binary numerical value of multi-byte is transferred, the data bus 3 is composed of four sets of signal lines through which data of 8 bits (1 byte) is transferred (corresponding to signal lines 30 to 33 in FIG. 3, described later). It should be understood that even when the address bus 2, the data bus 3 and the instruction bus 5 are composed not only as buses that are physically different from each other but also as physically one bus so as to function as buses temporary different from each other (so-called split transaction bus or the like), time of function as the buses is shown.

Figure 2:
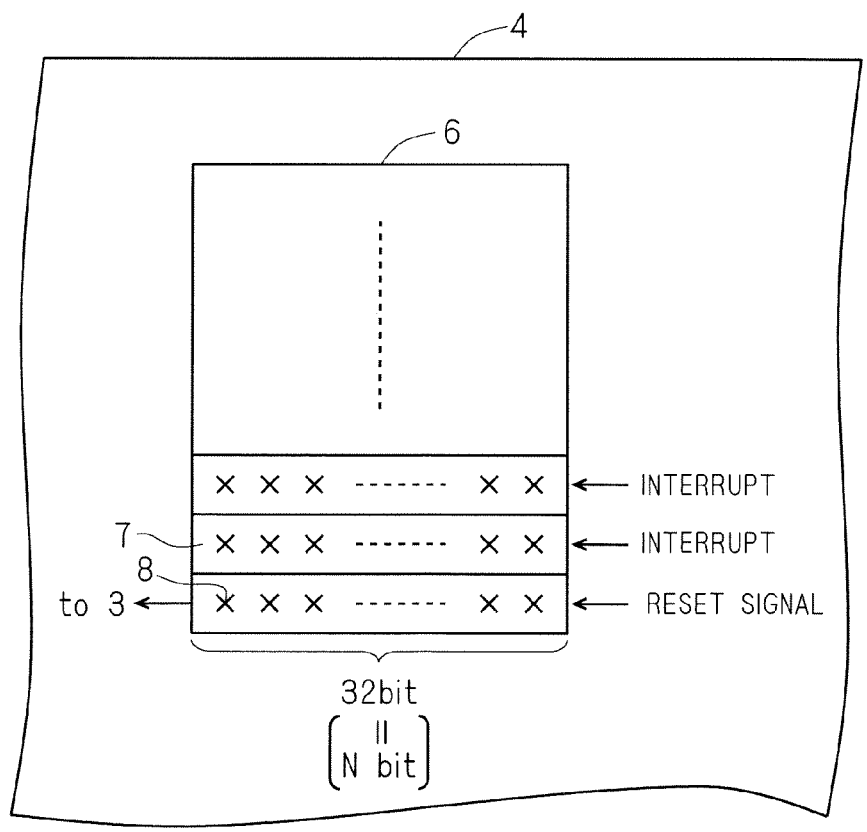
FIG. 2 is a diagram schematically illustrating a structure of a vector table stored in a memory region.

FIG. 2 is a diagram schematically illustrating a structure of a vector table 6 stored in the region 4R3 of the memory 4. The vector table 6 is a region where a plurality of vector addresses 7 each having N-bit size is collectively arranged. That is to say, the respective vector addresses 7 are addresses that indicate storage positions, according to input of a reset signal at the time of actuating the microcomputer and input of an interrupt signal for requesting a process of the interrupt program to be used commonly such as execution of a program of a debug process (both of them are called as "interrupt factors"), the storage positions are determined in advance according to respective interrupt factors and provided in the region 4R1 for storing corresponding interrupt processing program. When a reset signal is input from an outside at the time of activation, a reset vector address 8 of N bits is read via the data bus 3, and the reset vector address 8 is output to the CPU 1. When an interrupt signal is input into the CPU 1 at the time of operating the CPU, a vector address 7 corresponding to the input interrupt signal is read via the data bus 3, and is output to the CPU 1. In one example of this embodiment, a size N of each vector address 7 including the reset vector address 8 in bit unit is set to 32 (N=32). The endian of the data bus 3 is switched by a level of an endian signal given by the CPU 1 at the time of the resetting. That is to say, a state of a specific mode terminal and a state of a mode terminal shared by a general-purpose I/O port (external terminal) are captured into the microcomputer at the time of power-on reset, and are latched in a register, for example, so that a determination can be made whether the data has little endian or big endian before the CPU 1 accesses to the vector address.

The vector table 6 may be stored in a storage region of a readable/writable ROM (second memory) that is different from a memory for storing the instruction and the data (first memory) 4. In one example of this embodiment, it can be defined that the regions 4R1 and 4R2 in the storage regions of the memory 4 for storing the instruction and the data correspond to "the first memory", and the region 4R3 for storing the vector table 6 corresponds to "second memory".

When the memory 4 illustrated in FIG. 1 is composed of RAM (first memory), a readable/writable ROM for storing the vector table 6 is provided as the second memory mounted onto the semiconductor chip in the microcomputer or an external second memory (USB memory or the like) separately from the RAM 4.

FIG. 7 is a diagram illustrating a schematic constitution of the memory. A plurality of memory cells is arranged into an array pattern, and is connected to word lines and bit lines related respectively with the memory cells. In general, in the memory, an X decoder activates a predetermined word line based on an access address supplied from the CPU or the like, and a Y decoder reads data stored in the memory cell connected to this word line via the bit line. For example, in a case of the memory where an address 0 is supplied as the access address and the 0th word line is activated, data of number of bytes that should be accessed from a 0th bit line of the 0th word line is supplied to the CPU. That is to say, when X is supplied as the access address, a Yth word line (Y=XVI:X' is a bit expression of X that is X×8 and I is a number of memory cells per word line) is activated, and data are read from a Zth bit line (Z=X' mod I. mod is residue arithmetic).

Figure 3:
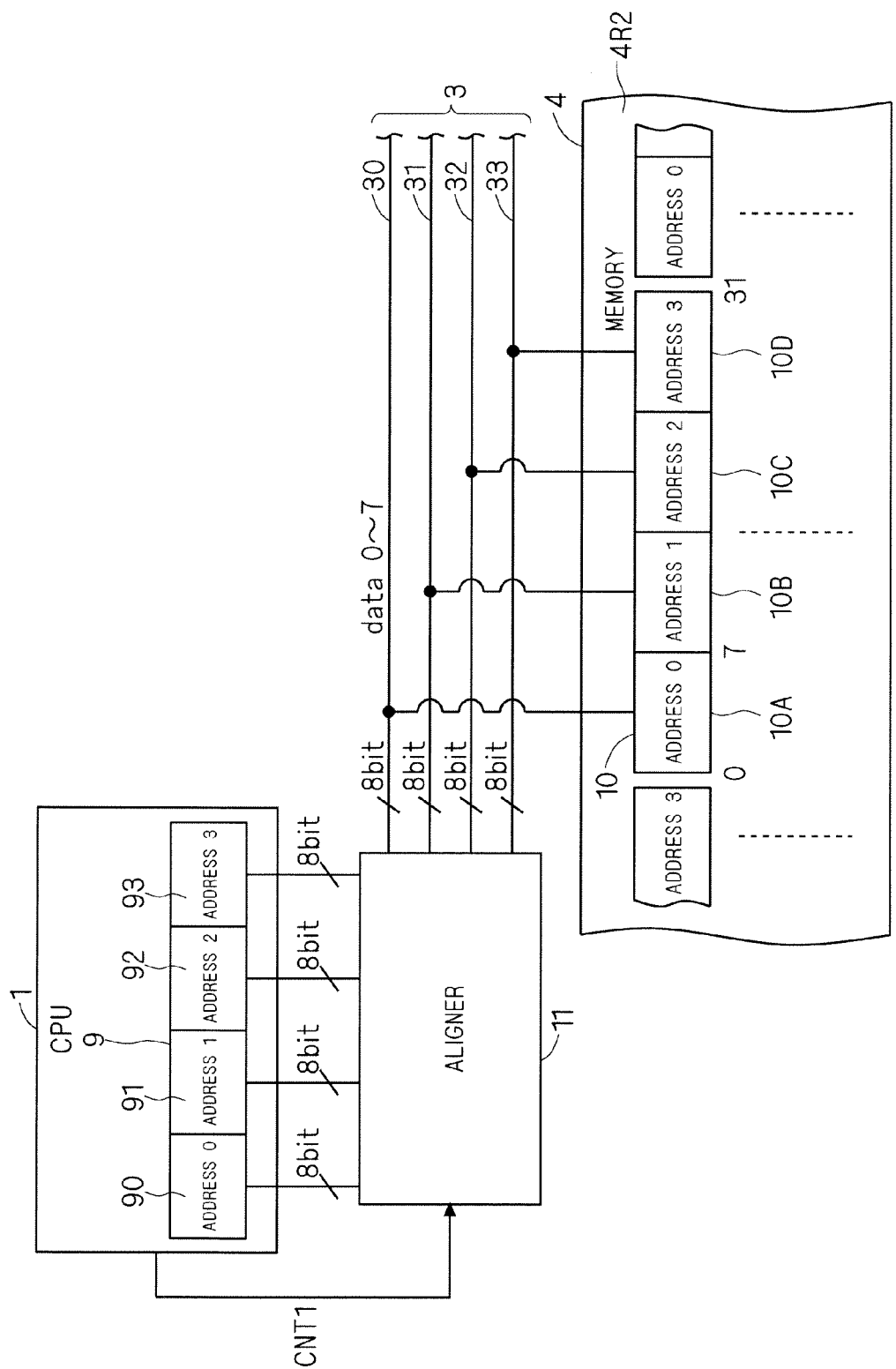
FIG. 3 is a block diagram schematically illustrating a signal wiring relationship at the time when CPU performs a data reading operation or a data writing operation in the bi-endian system.

FIG. 3 is a block diagram schematically illustrating a signal wiring relationship at the time when the CPU 1 performs the data reading operation or the data writing operation in a bi-endian system. The register (data register and a general-purpose register is mainly used) 9 that is arranged in the CPU 1 has storage regions 90, 91, 92 and 93 indicated by four addresses 0, 1, 2 and 3 in byte unit. On the other hand, a memory cell array of the storage region 4R2 of the memory 4 is constituted by aligning storage region 10 including one set of four storage regions 10A, 10B, 10C and 10D with addresses 0, 1, 2 and 3 in a row direction and a column direction in byte unit. The aligner 11 is composed of a switch group (not shown) including respective switches for switching ON/OFF operations according to a control signal CNT1 output from the CPU 1. The aligner 11 connects signal lines (respective lines of the data bus 3) 30 to 33, that are connected to addresses 10A to 10D of the storage region 10 via corresponding bit lines, to signal lines connected to addresses 90 to 93 of the register 9 according to types of endian of data or the data bus 3. FIG. 4 is a block diagram schematically illustrating a connecting relationship between the addresses of the register in the CPU 1 and the addresses of the storage region in the memory in case of 32-bit data access. When the side of $0^{th}$ address 90 of the register 9 is LSB, the side of $3^{rd}$ address 93 is MSB, the side of $0^{th}$ address 10A of the memory 4 is LSB and the side of $3^{rd}$ address 10A is MSB, the aligner 11 shows a connecting relationship in the case where data is little endian.

When the CPU 1 stores 32-bit data into the storage region 10 (access address X) of the memory 4, the CPU 1 predetermines an address of the region 4R2 in the memory 4 so that the 32-bit data is stored in the addresses 10A to 10D. That is to say, as shown in FIG. 5, (1) a byte order of the data is determined so that when the data is stored by little endian, the LSB side of data stored in the register has a byte order +0, and the MSB side has a byte order +3. Further, a byte orders +0 to +3 are determined similarly at addresses of storage destinations in the memory, and the data is stored so that the byte order of the data stored in the register matches with the byte order determined for the address of the storage destination. On the other hand, (2) when the data is stored by big endian, the byte order of the data is determined so that the MSB side of the data stored in the register has the byte order +0 and the LSB side has the byte order +3, and the byte order is determined also at the address of the storage destination in the memory, and the data is stored in the memory. The byte orders +0 to +3 determined for the addresses of the storage destinations in the memory correspond to the addresses 10A to 10D.

At the time of activation, a reset signal is input from the outside and the CPU 1 performs an operand access so as to obtain the reset vector address 8 of 32 bits shown in FIG. 2. The 32-bit reset vector address 8 gives an address of an instruction stored in the region 4R1 of the memory 4. Also when an interrupt signal is input into the CPU 1, the CPU 1 automatically performs the operand access so as to obtain the vector address 7 of 32 bit. Further, the CPU 1 performs an operation for fetching an instruction based on the reset vector address 8 or the vector address 7 corresponding to an interruption factor, and decodes the fetched instruction, so as to execute the instruction. In this state, a case where 32-bit data whose data size is the same as those of the reset vector address 8 and the vector address 7 is obtained from the memory and a case where 16-bit data whose data size is different from that of the vector address are described below.

FIG. 5 illustrates how the data alignment is changed at the time of data transfer. A place of the address 0 represented by an arrow is made to correspond to a 4-byte boundary (32n-bit line), and the 32-bit data is stored in memory cells of 32 bits (up to 32(n+1)—1st bit line). The aligner allocates a byte order to this data storage state according to endian of the data, and transfers the data to the register. Since the data are stored so that the byte order stored in the memory matches with the byte order at the time of storing in the register for each endian, the data orders stored in the register match regardless of endian at the time of 4-byte transfer.

When 16-bit data is transferred, the data alignment is changed as follows. The aligner allocates byte orders to 32-bit data starting from a 4-byte boundary of the memory according to the endian of the data. Data corresponding to the byte order +0/+1 of each endian are sequentially stored in the register starting from LSB. As shown in the drawing, since the byte order +0 allocated by the aligner corresponds to LSB of the register in the little endian, 2-byte data stored in the memory matches with 2-byte data stored in the register. On the other hand, since the byte order +0 allocated by the aligner corresponds to MSB of the register in the big endian, 2-byte data stored on the MSB side of the register is stored in the LSB side of the register at the time of 4-byte transfer. "\*" to be stored in the 2-byte MSB side of the register indicates that '0' or '1' or a code bit of the data expands to be stored.

The above description is applied also to a case where the CPU 1 accesses to 8-bit data.

The above description about the operation as one example mainly refers to the data reading operation, but the described characteristics in this embodiment can be applied also to the data writing operation by similarly relating the byte order of the data stored in the register to the byte order allocated by the aligner at the time of storing in the memory.

As described above, when the constitution of this embodiment is adopted as the constitution of the data processing device, data can be read/written from/into the memory at the same address and the same data alignment without depending on the types of endian of the data at the time of transferring a vector address and data whose size is the same as that of the vector address, at this time, a common program can be executed, and the vector table can be shared.

(Embodiment 2)

A characteristic of this embodiment is that the data bus between the respective I/O devices around the CPU and the CPU is separated into a data bus exclusive for little endian and a data bus exclusive for big endian in the bi-endian type microcomputer according to the embodiment 1.

FIG. 6 is a block diagram schematically illustrating the characteristic of this embodiment. As shown in FIG. 6, as the data bus for transferring data between the CPU 1 and the peripheral I/O devices around the CPU 1, a data bus 14 exclusive for big endian and a data bus 17 exclusive for little endian are provided. Peripheral I/O devices 15 and 16 exclusive for big endian are connected to the data bus 14 exclusive for big endian via individual signal lines, whereas peripheral I/O devices 18 and 19 exclusive for little endian are connected to the data bus 17 exclusive for little endian via individual signal lines. The respective peripheral I/O devices include, for example, an interrupt control circuit (INTC), a direct memory access controller (DMAC), a serial communication interface (SCI) and the like.

The CPU 1 stores data that are transferred between the CPU 1 and the peripheral I/O devices 15 to 19 into an I/O register 12. Endian of data stored in the I/O register 12 is any one of little endian and big endian. An aligner 13 is connected so that a byte order of data in the I/O register 12 matches with a byte order allocated to a corresponding data bus in the data bus 14 for big endian and the data bus 17 for little endian according to the endian types of data stored in the I/O register 12 under control of a control signal CNT2 output from the CPU 1. Address ranges where the registers and the memories in the peripheral I/O devices are present clarify whether little endian or big endian. That is to say, an address that is accessed by the CPU 1 is decoded so that a state of the control signal CNT2 is determined.

When the above constitution is adopted, endian of data to be transferred between the peripheral I/O devices and the CPU is fixed, and a common program can be used in the process for accessing to the peripheral I/O devices regardless of endian types. That is to say, since the aligner 13 allows a byte order of data to conform to the peripheral I/O devices, even when the data process is executed by using both the peripheral I/O device for big endian and the peripheral I/O device for little endian, a process that requires consideration of endian of the data in the peripheral I/O device, such as a process for converting endian of data in a program executed by the CPU, is unnecessary. Further, a data processing device having a plurality of data processing modules (so-called function IPs, and corresponding to the peripheral I/O devices in FIG. 6) on one semiconductor substrate is constituted so that buses are separated according to endian of data of the data processing modules and are connected to the CPU via the aligner, as a result, a load on hardware/software can be reduced when the data processing device is constituted in such a manner that a data processing module is selected so that endian of data matches in the constitution of the data processing device or endian of data is converted according to each data processing module by a program executed by the CPU of the data processing device.

(Embodiment 3)

FIG. 8 is a block diagram schematically illustrating one example of a microcomputer MCU.

The central processing unit (hereinafter, referred to as CPU) 1 fetches an instruction stored in a nonvolatile memory ROM or a volatile memory RAM and executes the instruction, so as to entirely control the process of the microcomputer MCU. A direct memory access controller DMAC controls data transfer between an external memory EMEM or the like and the memory 4 (composed of a nonvolatile memory ROM, a volatile memory RAM or the like) or between the memory 4 and a peripheral circuit group (IP1 and IP2). A bus controller BSC controls giving of a bus right or the like when the CPU 1 or another function block transfers data via a bus. An interrupt controller INTC accepts interruption generated inside or outside the microcomputer MCU, and controls an acknowledgment or the like to the CPU 1. The peripheral circuit group (IP1 and IP2) is a communication IF (InterFace) system (serial IO (Input/Output), parallel IO or the like) for communicating with another semiconductor integrated circuit device to be connected to the outside of the microcomputer MCU, a dedicated data processing system (image processing block, coding block or the like) and the like. An external bus interface BIF is connected to the external memory EMEM or the like via a bus connected to the outside of the microcomputer MCU.

Figure 10:
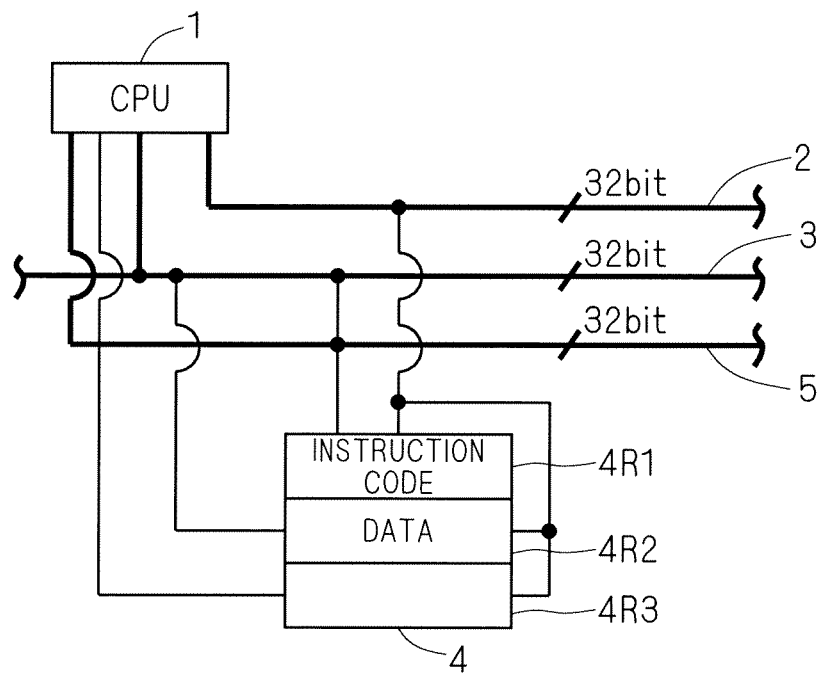
FIG. 10 is a diagram illustrating a schematic connecting relationship between the CPU and the memory.
Figure 11:
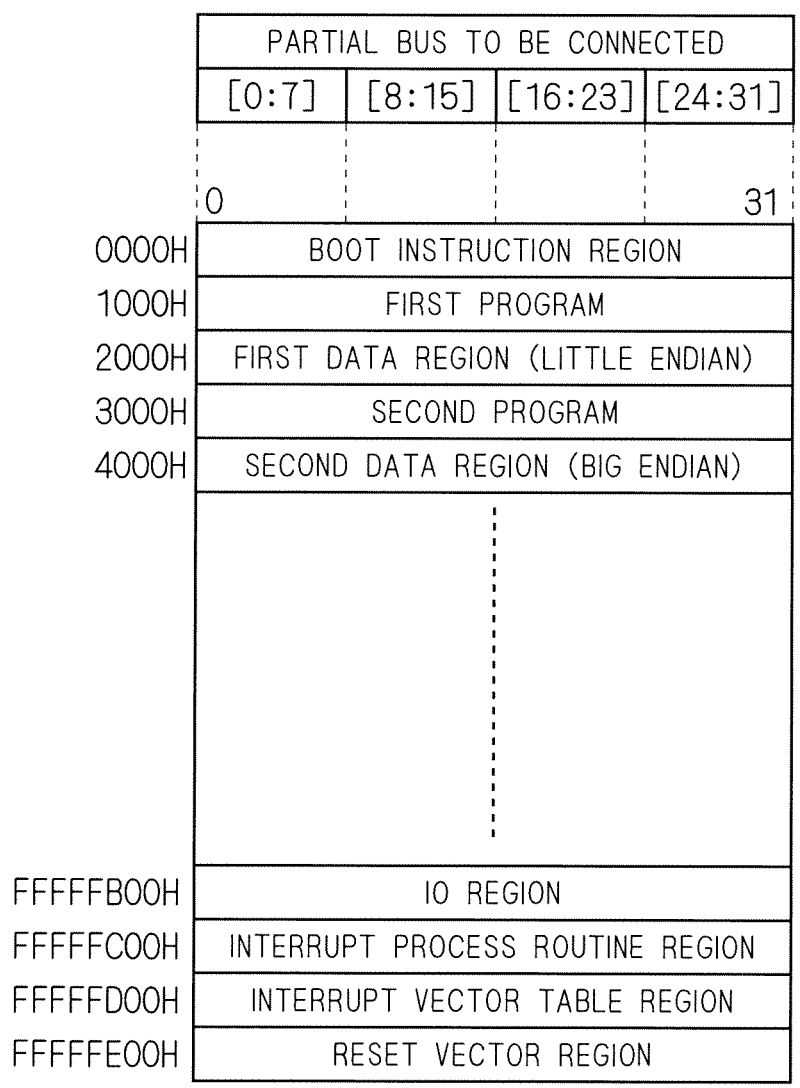
FIG. 11 is a diagram illustrating an address space of the memory allocated by the CPU.

FIG. 9 is a block diagram illustrating an outline of an inside of the CPU 1, FIG. 10 is a diagram illustrating a memory access relationship of the CPU 1, and FIG. 11 is a diagram illustrating address spaces of the memory 4 allocated by the CPU 1. In FIG. 11, "H" on a right side of the address indicates that an address is expressed in hex. In FIG. 11, addresses of only head addresses of respective regions are shown.

The bus for connecting the CPU 1 to another function block in FIG. 8 is composed of a 32-bit wide address bus 2, a 32-bit wide data bus 3, and a 32-bit wide instruction bus 5 shown in FIG. 10. In another bus constitution, a split transaction bus may be constituted so that an address, data and an instruction are exchanged on bus signal lines in time division. Further, in a case of an architecture such that data and an instruction are not accessed in parallel, the data bus 3 and the instruction bus 5 are not separated but may be composed of the same bus. Further, the data bus 3 and the instruction bus 5 may be 64-bit wide.

When the CPU 1 fetches an instruction, the CPU 1 outputs an address of the instruction, that is stored in a 32-bit wide program counter PC and should be fetched, to the address bus 2, and the memory 4 that receives the address via the address bus 2 outputs binary information corresponding to the address to the instruction bus 5. The CPU 1 stores the binary information received from the instruction bus 5 as an instruction to be executed into the instruction register IR, and an instruction decoder iDEC decodes the instruction, a control signal according to the decoded result is output to arithmetic units such as an arithmetic logical unit ALU, a multiplier MLT, a divider DIV, a shift arithmetic unit SHFT and a floating-point arithmetic unit, and the arithmetic units carry out corresponding operations on data stored in a register group REG (a general-purpose register and a dedicated register), the memory 4 and the like.

Further, when the CPU 1 receives an interrupt acknowledgment from the interrupt controller INTC, in order to execute an interrupt process corresponding to the received interrupt acknowledgment, the CPU 1 outputs an address corresponding to the received interrupt acknowledgment in addresses in interrupt vector table regions of the memory 4 (addresses FFFFFD00H to FFFFFDFFH) to the address bus 2, and the memory 4 outputs binary information corresponding to the address to the data bus 3. The CPU 1 sets the binary information received from the data bus 3 as an address where an interrupt process routine is stored (vector address) in the program counter PC, and carries out branch in order to execute the instruction of the interrupt process routine. The vector address is 32-bit (4-byte) wide. Vector addresses for exception processes other than the interrupt acknowledgment from the interrupt controller INTC (for example, a privileged instruction exception process, an undefined instruction exception process and the like) are also stored in the interrupt vector table regions.

A reset vector region (address FFFFFE00H in FIG. 11) is a region where an address where a program to be executed just after end of a reset period is stored (for example, a head address 0000H in a boot instruction region) when the microcomputer MCU is powered on or a reset signal is input thereto from an outside. Although the interrupt process and the reset process are different from each other because of whether a cause is interrupt or reset, they are approximately similar in obtaining of branch addresses.

Endian of instructions stored in program regions such as a boot instruction region, a first program region, a second program region and an interrupt process routine region is fixed to any one of little endian or big endian. Endian of data in vector regions such as the reset vector region and the interrupt vector table is also fixed to any one of little endian or big endian. The endian may be fixed at the time of manufacturing a microcomputer, or may be fixed until an access to a vector region is carried out after power-on reset at the latest. In the latter case, states of a dedicated mode terminal and a mode terminal shared by a general-purpose I/O port (external terminal) are captured into the microcomputer at the time of the power-on reset, and are latched in the register, for example, so that the CPU 1 may define whether endian of data is little endian or big endian before the CPU 1 accesses to the vector address.

A first program is stored in a region ranging from address 1000H to 1FFFH in the memory 4. A second program is stored in a region ranging from address 3000H to 3FFFH in the memory 4. The first program and the second program have a first data region (addresses 2000H to 2FFFH) and a second data region (addresses 4000H to 4FFFH), respectively. The first program treats the endian of the data in the first data region as the little endian in data processing, and the second program treats the endion of the data in the second data region as the big endian in data processing. For example, the first program is a program for processing data generated by a peripheral circuit for processing data with little endian, and the second program is a program for processing data generated by a peripheral circuit for processing data with big endian.

A determination is made in advance by the address range of the address space of the CPU 1 whether data of little endian or big endian is processed. Which data of little endian or big endian is processed may be set to the register by the CPU according to the address range. Further, after the reset is released, data stored in the built-in nonvolatile memory in advance is automatically transferred to the register, so that data of little endian or data of big endian to be processed may be set.

When the interrupt acknowledgment is generated from the interrupt controller INTC while the CPU 1 is executing the first program, the access to the interrupt vector table region (address FFFFF00H to FFFFFDFFH) is carried out by prefixed endian.

On the other hand, when the interrupt acknowledgment is generated while the CPU 1 is executing the second program, the access to the interrupt vector table region is carried out by prefixed endian.

Figure 12:
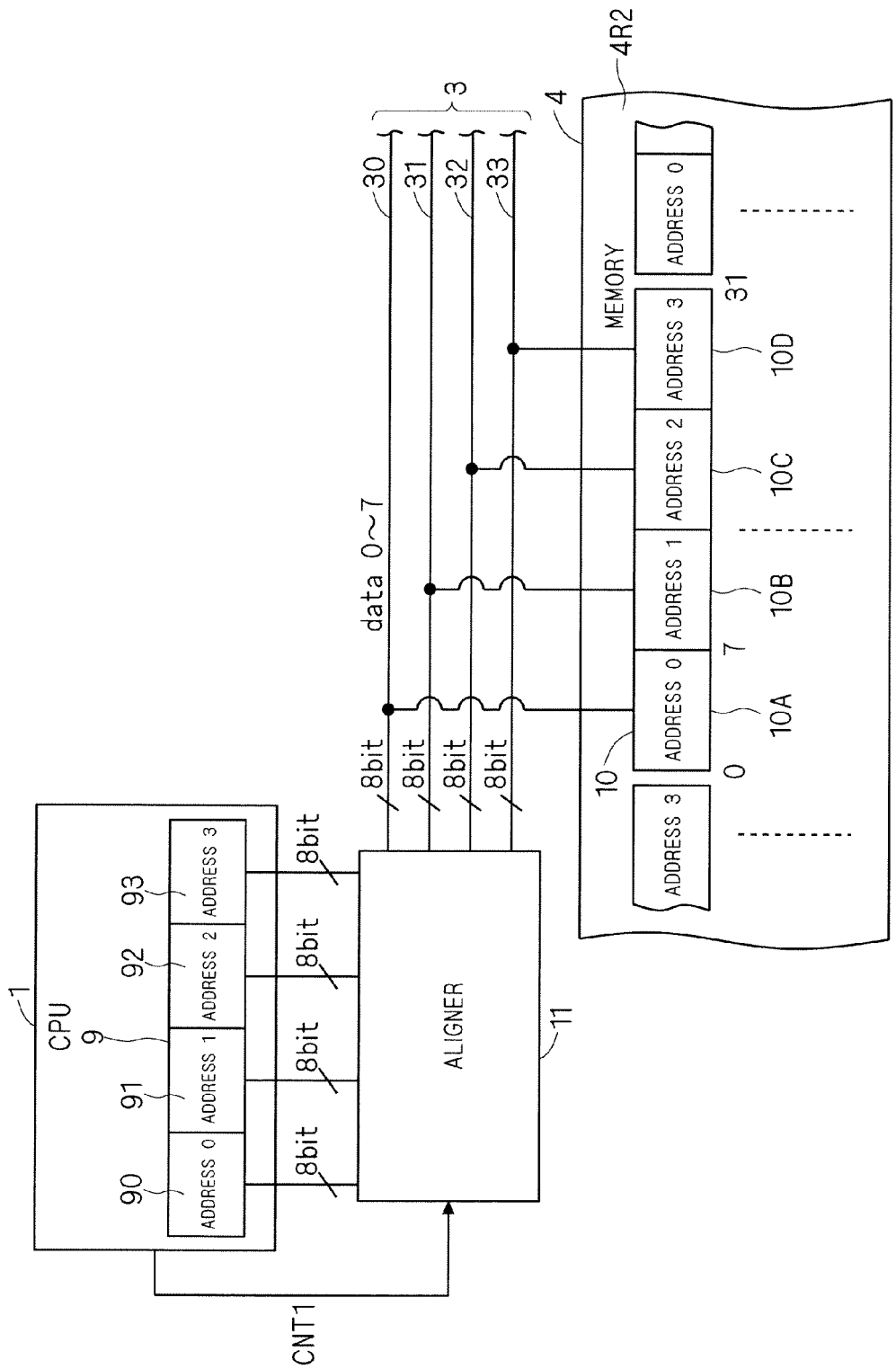
FIG. 12 is a diagram illustrating an access relationship at the time of data transfer between the memory and the register.

FIG. 12 is a diagram illustrating an access relationship at the time of transferring data between the memory 4 and the register 9 of the CPU 1, and FIG. 13 is a diagram illustrating one example of the aligner 11.

When data is transferred from the memory 4 to the register 9 (one register in the register group REG) and the data to be transferred is stored in regions indicated by the 10A to 10D in the memory 4, data (10A) at relatively displaced address 0 is output to a 8-bit partial bus of the data bus 3 shown by number 30. Similarly thereafter, data at displaced addresses 1 to 3 (10B to 10D) are output to 8-bit partial buses shown by numbers 31, 32 and 33. The aligner 11 determines 8-bit partial regions in the register at relatively displaced addresses 0 to 3 where the data output to the partial buses shown by numbers 30 to 33 are stored, respectively, according to a state of the control signal CNT1. The control signal CNT1 is a signal that is generated based on information such as little endian or big endian, a size of an access to the memory 4 and an access byte address.

At first, a case of an access with 4 bytes that is a size of the vector address such as the reset vector address and the interrupt vector address (hereinafter, referred to as interrupt vector address) for performing data transfer from the memory 4 to the register is described. In this case, the aligner 11 is set so as to be in a connecting state shown in FIG. 14. FIG. 14 is a block diagram schematically illustrating a connecting relationship between addresses of the register in the CPU and addresses of storage regions in the memory 4 in the case of 4-byte access. When the side of $0^{th}$ address 90 in the register 9 is LSB, the side of $3^{rd}$ address 93 is MSB, the side of $0^{th}$ address 10A in the memory 4 is LSB and the side of $3^{rd}$ address 10D is MSB, the aligner 11 shows a connecting relationship in a case where the endian of the data in the memory 4 is identical to the endian of the data in the CPU 1. That is to say, when the endian of the data in the CPU 1 is little endian, the endian of the data in the memory 4 is little endian. As one example, a case where the endian of the data in the CPU 1 is little endian is described below.

In FIG. 13, when 4-byte access to data in the first data region (the data of little endian) is carried out, 4-byte data to be connected to partial buses [0 7] (data bus 30), [8:15] (data bus 31), [16:23] (data bus 32) and [24:31] (data bus 33) are output, and are stored in displaced address 0 (90), address 1 (91), address 2 (92) and address 3 (93) in the register 9 so that data to be output to the partial bus [24:31] becomes the MSB side of the register. On the other hand, when data in the second data region (data of big endian) is accessed, data to be connected to the partial buses [0:7], [8:15], [16:23] and [24:31] are stored in displaced addresses 0, 1, 2 and 3 in the register 9 so that the data to be output to the partial bus [24:31] becomes the MSB side of the register. That is to say, when any of the data in the first data region or the second data region is accessed, selectors 1 to 4 of the aligner 11 are set so that the order of the storage in the register 9 in the CPU 1 matches at the access with interrupt vector address size. The selectors 1 to 4 are composed of four bidirectional switches, and the bidirectional switches are composed of CMOS transfer gates. The control signal CNT1 directly controls the bidirectional switches or is decoded to control the bidirectional switches.

Similarly, even when the interrupt acknowledgment is generated during the execution of the first program or the second program, 4-byte data to be connected to the partial buses [0:7], [8:15], [16:23] and [24:31] that store the interrupt vector address are output, and are stored in displaced address 0, 1, 2 and 3 in the register so that the data to be output to the partial bus [24:31] becomes the MSB side of the register.

The register in which the interrupt vector address is stored is the program counter PC, and the address stored in the program counter PC is updated, so that branching into the interrupt process routine is carried out.

Such a branching operation is not only the branch into the interrupt process routine at the time of the occurrence of the interrupt acknowledgment but also an execution of the instruction with an address modification such as an address modification branching instruction or the like.

As to the address modification branching instruction, for example, the following instructions $$\text{jmp @\#adr} \qquad (1)$$

$$\text{jmp @Rn} \qquad (2)$$

are described. "@" included in the instructions represents that the address modification is carried out, "#" represents that subsequent binary information is recognized as numerical information, and Rn represents that a register number is specified.

In the instruction (1), an address of branch destination is stored in an address of the memory 4 shown by adr, and in execution of this instruction, an access to the address adr is carried out and the address of the branch destination with the same size as that of the interrupt vector address is obtained so as to be transferred to the program counter PC. An address stored in the program counter PC is updated to the address of the branch destination, so that the instruction branch can be executed. In the instruction (2), the address adr in the instruction (1) is stored in the register, and the register Rn is accessed so that the address adr is obtained. A subsequent operation is the same as that in the instruction (1).

Cases where 2-byte data whose size is a half of the interrupt vector address size and 1-byte data are transferred from the memory 4 to the register are described below. When 2-byte data and 1-byte data are transferred from the memory 4, 4-byte data is read from the memory 4 and then 2-byte data or 1-byte data to be read is transferred to the register.

When transmission of 2-byte data from address 2000H in the first data region is specified, the selector 3 connects the partial bus [24:31] to displaced address 1 in the register 9 and the selector 4 connects the partial bus [16:32] to displaced address 0 in the register for the data to be connected to the partial buses [24:31] and [16:23] in the 4-byte data read starting from the address 2000H as a head. In this case, the selectors 1 and 2 are controlled so that data to be connected to the partial buses [0:7] and [8:15] are not stored in the register.

When transfer of 2-byte data from address 2002H is specified, the selector 3 connects the partial bus [24:31] to displaced address 1 in the register and the selector 4 connects the partial bus [16:23] to displaced address 0 in the register for data to be connected to the partial buses [8:15] and [0:7] in the 4-byte data read starting from the address 2000H as a head. In this case, the selectors 1 and 2 are controlled so that the data to be connected to the partial buses [0:7] and [8:15] are not stored in the register.

On the other hand, when transfer of 2-byte data from address 4000H in the second data region is specified, the selector 3 connects the partial bus [0:7] to displaced address 1 in the register 9 and the selector 4 connects the partial bus [8:15] to displaced address 0 in the register 9 for data to be connected to the partial buses [0:7] and [8:15] in the 4-byte data read starting from the address 4000H as a head. In this case, the selectors 1 and 2 are controlled so that the data to be connected to the partial buses [0:7] and [8:15] are not stored in the register.

Further, when transfer of 2-byte data from address 4002H is specified, the selector 3 connects the partial bus [16:23] to displaced address 1 in the register and the selector 4 connects the partial bus [24:31] to displaced address 0 in the register for data to be connected to the partial buses [16:23] and [24:31] in 4-byte data read starting from the address 4000H as head. In this case, the selectors 1 and 2 are controlled so that the data to be connected to the partial buses [0:7] and [8:15] are not stored in the register.

A case where 1-byte data whose size is ¼ of the interrupt vector address size is transferred from the memory 4 to the register 9 is described below.

When transfer of 1-byte data from address 2000HH in the first data region is specified, data to be connected to the partial bus [0:7] is output, and the selector 4 connects the partial bus [0:7] to the displaced address 0 in the register. Further, when transfer of 1-byte data from address 2001H is specified, data to be connected to the partial bus [8:15] is output, and the selector 4 connects the partial bus [8:15] to the displaced address 0 in the register. Further, when transfer of 1-byte data from address 2002H is specified, data to be connected to the partial bus [16:23] is output, and the selector 4 connects the partial bus [16:23] to the displaced 0 address in the register. Further, when transfer of 1-byte data from address 2003H is specified, data to be connected to the partial bus [24:31] is output, and the selector 4 connects the partial bus [24:31] to the displaced address 0 in the register.

On the other hand, when transfer of 1-byte data from address 4000H in the second data region is specified, data to be connected to the partial bus [24:31] is output, and the selector 4 connects the partial bus [24:31] to the displaced address 0 in the register. Further, when transfer of 1-byte data from address 4001H is specified, data to be connected to the partial bus [16:23] is output, and the selector 4 connects the partial bus [16:23] to displaced address 0 (shown by number 90) in the register. Further, when transfer of 1-byte data from address 4002H is specified, data to be connected to the partial bus [8:15] is output, and the selector 4 connects the partial bus [8:15] to the displaced address 0 (shown by number 90) in the register. Further, when transfer of 1-byte data from address 4003H is specified, data to be connected to the partial bus [0:7] is output, and the selector 4 connects the partial bus [0:7] to a displaced address 0 in the register.

The aligner 11 may be provided between the register 9 of the CPU 1 and the data bus 3, and may be provided into the CPU 1, for example.

Further, an aligner for the external memory EMEM may be provided in an external bus interface BIF. In this case, the register may be set switching between big endian and little endian by the CPU for each address space of the external device such as the external memory EMEM.

The above have described the case where data of various sizes are transferred from the memory 4 to the register 9, but the same is true in a case where data is transferred from the register 9 to the memory 4. When data is transferred from the memory 4 to the register 9 and data sizes are 2 bytes and 1 byte, as to a portion of data that is not transferred, its code is expanded (0 expansion or 1 expansion may be carried out). On the other hand, when data is transferred from the register 9 to the memory 4 and data sizes are 2 bytes and 1 byte, a portion that is not transferred is not influenced.

In the embodiment 3, when an access to the memory 4 is carried out in unit of the interrupt vector address size regardless of whether data in the memory 4 is of little endian or big endian, the data is stored in the same order, and thereby the interrupt vector address and a program such as the interrupt process program can be shared regardless of endian of data about a program being executed at the time of reception of the interrupt acknowledgment.

In the embodiment 3, the regions of big endian and little endian can be set by address spaces in the memory, but similarly to the embodiment 1, the entire memory 4 built into the microcomputer may be set to any one of big endian and little endian. In this case, similarly to the embodiment 3, states of the dedicated mode terminal and the mode terminal shared by the general-purpose I/O port (external terminal) are captured into the microcomputer at the time of power-on reset, and latched into the register, for example, so that a determination is made whether the endian of the data is little endian or big endian before the CPU 1 accesses to the vector address.

(Embodiment 4)

FIG. 15 illustrates an outline of a microcomputer having peripheral function blocks of different endian, and the other parts of the constitution are similar to those of the microcomputer MCU (FIG. 8) according to the embodiment 3. FIG. 15 illustrates the CPU 1, a bus controller BSC, peripheral function blocks for little endian (peripheral I/O devices 18 and 19 for little endian) that are connected to the bus controller BSC and execute the data process with little endian, and peripheral function blocks for big endian (peripheral I/O devices 15 and 16 for big endian) that are connected to the bus controller BSC and execute the data process with big endian. The peripheral device blocks for little endian are connected to the aligner 13 in the bus controller BSC via a peripheral data bus 17 for little endian, and the peripheral function blocks for big endian are connected to the aligner 13 in the bus controller BSC via a peripheral data bus 14 for big endian. In this constitution, a transfer buffer TBL and the like in the peripheral I/O device 19 for little endian, a transfer buffer TBB and the like in the peripheral I/O device 15 for big endian, and an I/O register 12 of the CPU 1 (one register of the register group REG: this may be the same as the register 9) are connected to buses so that LSB is commonly connected regardless of sizes of the transfer buffers and the registers in the peripheral I/O devices. The peripheral I/O devices 18 and 19 for little endian or the peripheral I/O devices 15 and 16 for big endian can be discriminated by addresses allocated to the transfer buffers and the registers.

The peripheral I/O devices 18 and 19 for little endian receive data with sequence of little endian from the outside or the peripheral data bus 17 for little endian, or process the data and generate data with sequence of little endian, so as to output the data to the peripheral data bus 17 for little endian.

The peripheral I/O devices 15 and 16 for big endian receive data with sequence of big endian from the outside or the peripheral data bus 14 for big endian, or process the data and generate data with sequence of big endian so as to output the data to the peripheral data bus 14 for big endian.

The CPU 1 executes the first program so as to control operations of the peripheral I/O devices 18 and 19 for little endian, and controls input/output of data to the peripheral I/O devices 18 and 19 for little endian. For example, when data is transferred to the peripheral I/O devices 18 and 19 for little endian and the processed data is transferred to the memory 4, transfer setting information of the aligner 13 is set in the control signal CNT2 according to a size of the data to be transferred. The control signal CNT2 is set similarly also in data transfer in the peripheral I/O devices 15 and 16 for big endian.

When the sizes of the transfer buffers and the registers in the peripheral I/O devices are the same as sizes of accesses to the transfer buffers and the registers the aligner 13 is constituted so that the data has the same sequence regardless of endian. For example, when the CPU 1 transfers data stored in the transfer buffer TBL of the peripheral I/O device 19 for little endian to the second data region of the memory 4 (big endian), the data of interrupt vector address size is stored from a specified address of the transfer buffer as a head in a specified address of the second data region as a head. In this case, data stored in the transfer buffer TBL is once captured into the register in the CPU 1 and then is transferred to the second data region of the memory 4.

Further, when data is transferred from the peripheral I/O device 19 for little endian to the peripheral I/O device (15, 16) for big endian and the second data region (big endian), data, that is stored in an LSB side at the time when the peripheral I/O device 19 for little endian stores data in the transfer buffer, is made to be the same as data that is stored in LSB sides of the I/O register 12 of the CPU 1 for processing the data, the transfer buffer TBB of the peripheral I/O device 16 for big endian and the register BIREG of the peripheral I/O device 15 for big endian, as a result, when the sizes of the transfer buffers and the registers in the peripheral I/O devices are the same as the sizes of the accesses to the transfer buffers and the registers, it is not necessary to change the sequence of data using aligner 13.

On the other hand, when the sizes of the accesses to the transfer buffers and the registers are smaller than the sizes of the transfer buffers and the registers in the peripheral I/O devices, the aligner 13 needs to change the sequence of data.

The control signal CNT2 for setting the transfer setting information of the aligner 13 by the CPU 1 includes size information about the data to be transferred, information relating to a processing unit of the data to be transferred, and information relating to a transfer direction.

Figure 16:
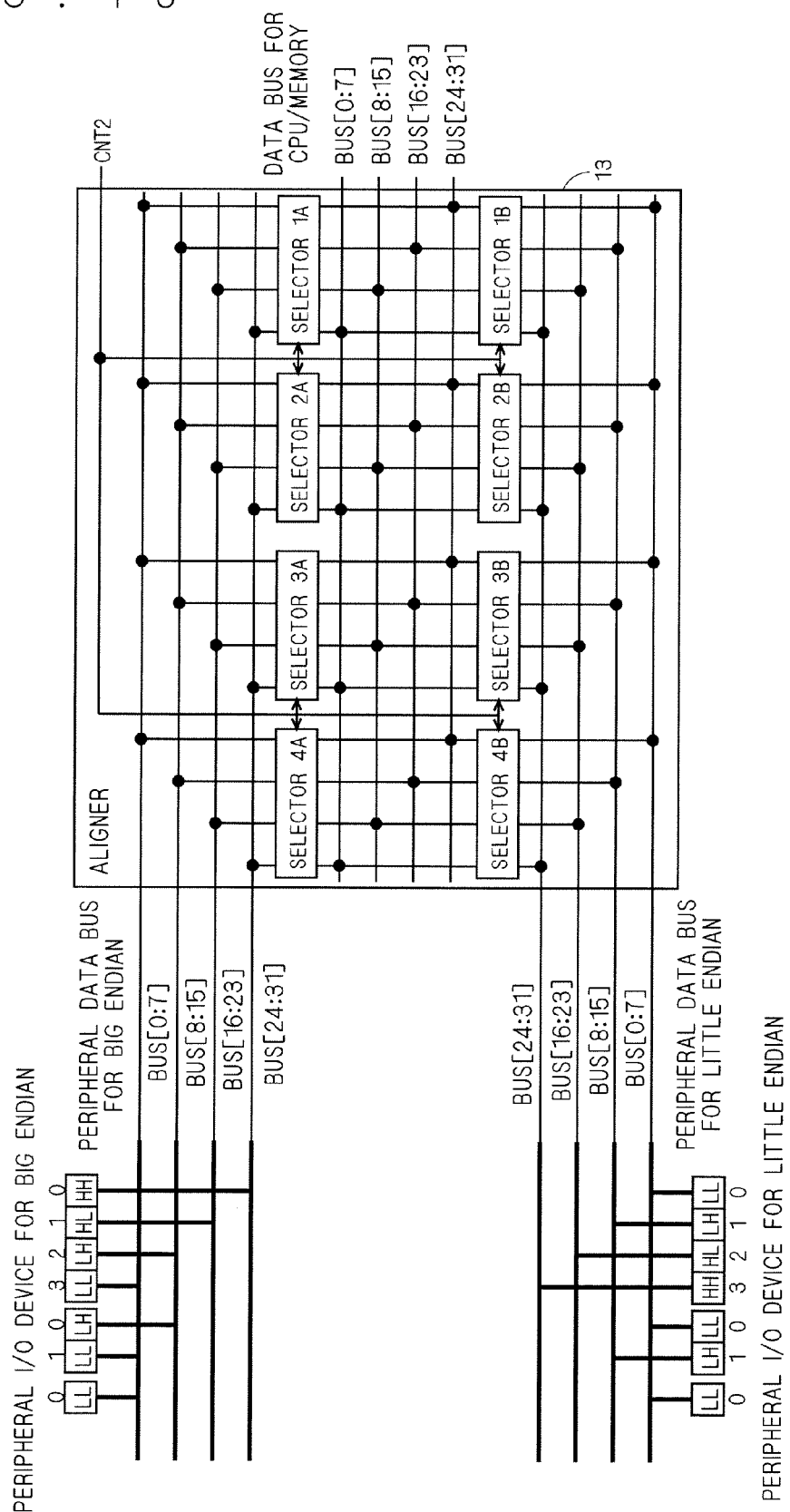
FIG. 16 is a diagram illustrating one example of the aligner.

FIG. 16 illustrates a constitutional example of the aligner 13. The control signal CNT2 is input into selectors 1A to 4A and 1B to 4B, and they determine input/output directions and connection between partial buses. When the sizes of the transfer buffers and the registers in the peripheral I/O devices are the same as the sizes of the accesses to the transfer buffers and the registers, data buses on the same bit position (the peripheral data bus 17 for little endian, the peripheral data bus 14 for big endian and the partial bus [0:8] of the data bus 3 for the CPU 1/the memory 4) are connected.

On the other hand, when the sizes of the transfer buffers and the registers in the peripheral I/O devices are 2 bytes or 4 bytes and data that is processed in byte unit is transferred from the peripheral data bus 17 for little endian to the peripheral data bus 14 for big endian, the partial buses are connected so that the sequence of the data is reversed (for example, in the case of 4 bytes, one partial bus [0:7] and the other partial bus [24:31], one partial bus [8:15] and the other partial bus [16:23]).

The selectors 1A to 4A and 1B to 4B are composed of bidirectional switches that are similar to the selectors 1 to 4 according to the embodiment 3.

When the aligner 13 is constituted in such a manner, the peripheral function blocks are connected to different buses according to endian to be processed, and data can be transferred between the peripheral function blocks connected by the buses via the aligner 13.

In the embodiment 4, the data transfer in the same data order is enabled regardless of the endian of data to be transferred to/from the peripheral function IP and the endian of data to be processed in the program for controlling the peripheral function IP, so that the program for controlling the peripheral function IP can be shared.

Further, a freedom degree of adopting peripheral function blocks necessary in the microcomputer MCU can be improved regardless of whether the endian of the data process in the peripheral function blocks and the endian of the data process in the CPU 1 are the same or different.

(Embodiment 5)

FIG. 17 illustrates a flow outline of a development tool of a program to be executed by the microcomputer according to the embodiments 1, 2, 3 and 4 and an embodiment 6, described later. A compiler executes the analysis and the like and the optimization of a structure of a source program described in high-level language such as C language, and outputs an assembly language program described in assembly language. An assembler generates machine language based on the assembly language output from the compiler and outputs a machine language program. One or a plurality of machine language program(s) is/are linked (link process) by a linkage editor, and a program executable by the microcomputer is generated.

The assembly language program output from the compiler mainly has a code section (or a code segment) that is an aggregate part of instruction codes to be executed by the CPU or the like of the microcomputer, and a data section (or a data segment) that is an aggregate part of constants described in the high-level language program, constants output from the compiler and the like. An instruction code in the code section is fixed any one of little endian and big endian as described above. On the other hand, as the constant or the like in the data section, any one of little endian or big endian can be selected, but the high-level language program has an instruction for specifying which endian is used, and endian solution is carried out according to the specifying instruction.

In a case of a constant included in the high-level language or the assembly language program, the compiler or the assembler enables the endian solution, but an address reference value of a branch destination address or the like of the branch instruction is determined at the time of the link process of the linkage editor, for this reason, the compiler or the assembler cannot carry out the endian solution. Such address endian solution is carried out by the linkage editor.

The linkage editor links one or a plurality of machine language program(s) and determines an address value by an arrangement after the link with respect to an address reference value that is referred to as a variable name in the machine language program before link, and carries out the endian solution so that the address value is stored as an address constant into the data section of the executing program.

The executable program generated by the above flow is stored in a mask ROM or a flash memory structured on the semiconductor substrate of the microcomputer, and can be executed by the microcomputer.

In correspondence to the above-described embodiment 3, when data is transferred from the data section to the register, the control signal CNT1 for setting the aligner 11 according to the data transfer size is output, and a sequence of the data stored in the data section is determined.

Further, an address reference value and an address constant including the interrupt vector address are allowed to have the same data size. As a result, in obtaining of the address information with the interrupt vector address size at the time of executing another branch instruction and address reference instruction, address information can be suitably obtained regardless of endian of the stored data section.

In correspondence to the embodiment 4, when data is transferred between the peripheral function blocks or between the peripheral function blocks and the memory 4 or the register, the control signal CNT2 for setting the aligner 13 according to the process unit of the data as well as the data transfer size are output, and the data sequence at the time of the data transfer is determined.

(Embodiment 6)

An improvement in a processing performance in the microcomputer MCU, an improvement in code efficiency and an improvement in power consumption are described below. The improvement in the code efficiency means that a memory capacity necessary for storing an instruction is reduced.

FIG. 18 illustrates evaluation items of the processing performance of the microcomputer MCU. The microcomputer MCU varies in the processing performance necessary according to applications to be used, but FIG. 18 shows one example of the processing performance required in the microcomputer MCU that is incorporated into a device for executing a comparatively high-level process such as a so-called digital home electrical appliance and is used.

Figure 19:
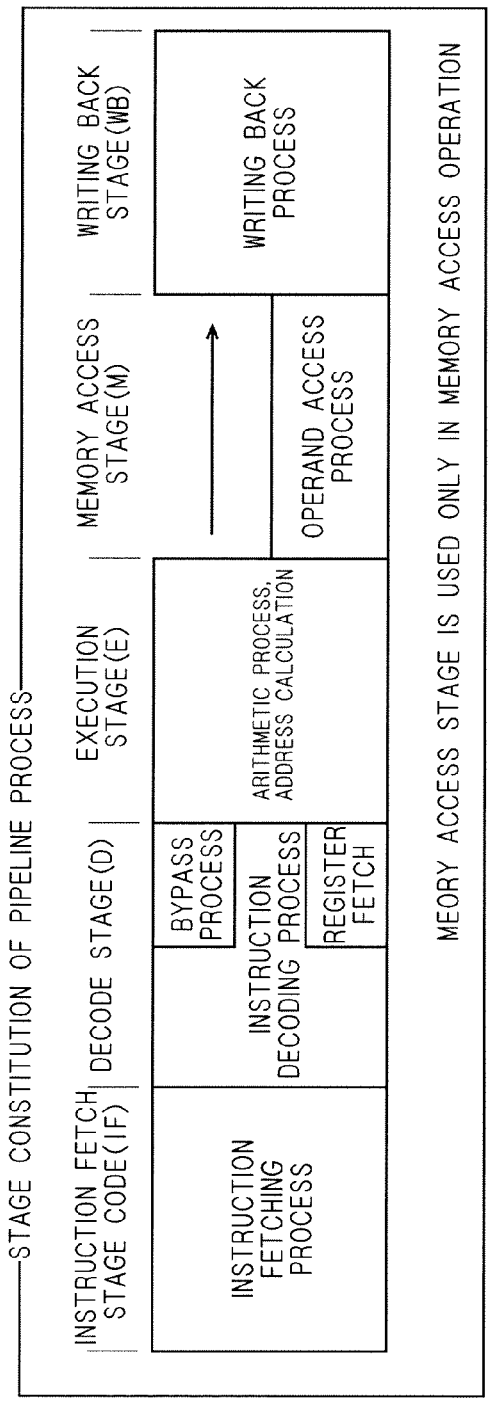
FIG. 19 is a diagram illustrating an outline of a pipeline process of an instruction.

In order to realize such a processing performance, as shown in FIG. 19, a 5-stage pipe line process is adopted. As to the pipeline process, as generally known, the instruction execution in the CPU 1 is divided into a plurality of process stages, and the respective process stages are executed at one cycle of a clock.

At a memory fetch stage, an instruction is fetched from the memory 4 into the instruction register IR. At a decode stage, the instruction fetched into the instruction register IR is decoded, and an arithmetic unit for executing an instruction at a subsequent executing stage is scheduled. Further, at the decode stage, a bypass process for ending a pipeline is executed for an instruction such as an NOP instruction that does not have to be executed, or register fetch for fetching contents of the register to be used for arithmetic is executed.

At the executing stage, the arithmetic process and address calculation are executed by the scheduled arithmetic unit and the fetched contents of the registers that are provided at the decode stage. At a memory access stage, when an operand requiring a memory access is present in an instruction, the memory access is carried out.

At a writing-back stage, an arithmetic result at the executing stage is stored in the register or the like, and the process for ending the pipeline according to the instruction is executed.

Figure 20:
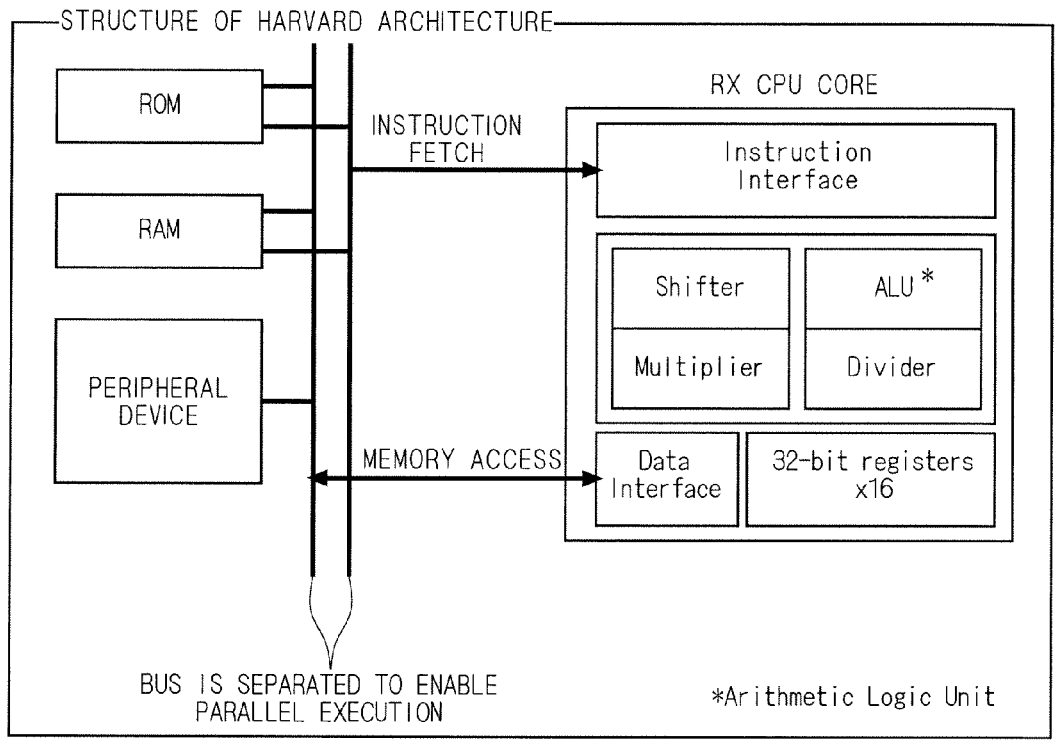
FIG. 20 is a diagram illustrating an outline of a bus constitution in Harvard architecture.
Figure 21:
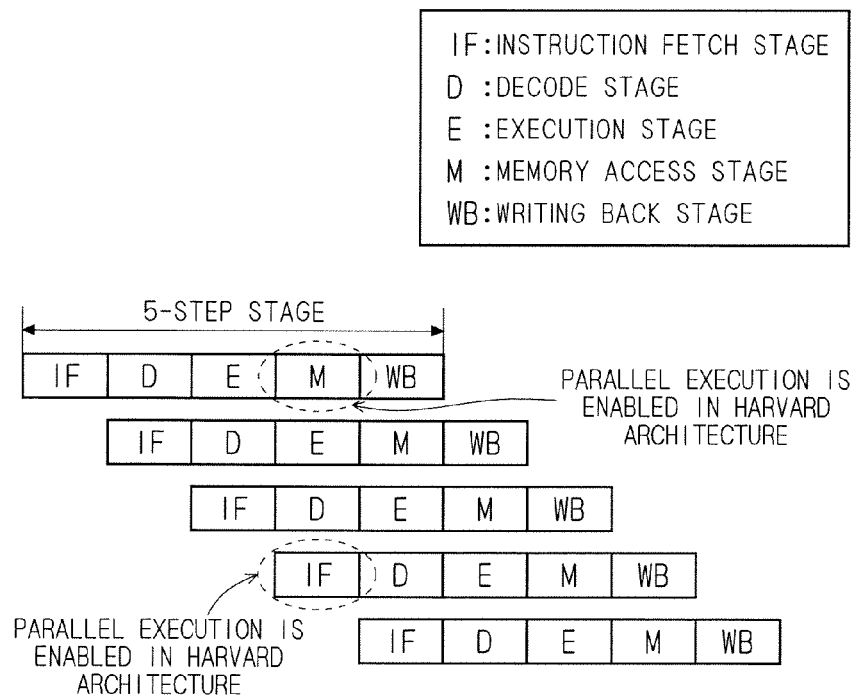
FIG. 21 is a diagram illustrating an outline of a pipeline process in the Harvard architecture.

FIG. 20 illustrates a bus constitution between the CPU 1 and the memory 4 about the microcomputer MCU. As shown in FIG. 21, the pipeline process is executed, and the respective process stages of the instruction execution in the CPU 1 are executed by an execution of different process stages with a plurality of instructions so that an effective processing performance per one instruction is improved. In this case, timing of the memory access stage of the instruction having the operand requiring the memory access is the same as timing of the instruction fetch, a conflict of memory access occurs. For this reason, a Harvard architecture where the instruction bus 5 for executing instruction fetch is separated from the memory access bus (data bus 3) for operand is adopted, thereby reducing an opportunity to generate conflict of memory accesses.

Instruction Interface shown in FIG. 20 corresponds to the instruction register IR and the instruction decoder iDEC shown in FIG. 9. Data Interface is an interface with respect to the memory access bus, and controls a memory access for operand.

The adoption of the Harvard architecture and the pipeline process in the CPU 1 enables the conflict of memory accesses by the CPU 1 (the instruction fetch and the operand fetch) to be avoided, and thus the instruction executing performance in the CPU 1 can be improved.

So-called digital home electrical appliances include devices for executing a moving image process, such as DVD (including high recording density standards) and digital TV in no small measure. In the moving image process, a DSP (Digital Signal Processing) operation, such as a product-sum operation, is repeatedly performed for each pixel.

As shown in FIG. 22, when data for each pixel stored in the memory 4 is read for each DSP operation and the operation is repeated, the process for reading data into the register becomes overhead with respect to actual operation. For this reason, a memory-to-memory product-sum operation instruction, that reads two data to be used for the operation directly from the memory 4, performs multiplication and executes a process for adding the operated results, can be executed.

Further, a register-to-register product-sum operation instruction, that performs the product-sum operation similarly also on data that have already stored in the register, can be executed.

In the product-sum operation using a lot of data stored in the memory 4 according to the memory-to-memory product-sum operation instruction, time for transferring data from the memory 4 to the register can be reduced and thus the processing efficiency of the arithmetic unit is improved, and since the transfer instruction for transferring data from the memory 4 to the register is not necessary, the code efficiency is improved. Further, the product-sum operation using stored data in the register can be executed at high speed by the register-to-register product-sum operation instruction, thereby improving the processing efficiency of the arithmetic unit.

Further, in a coordinate operation or the like, a floating point arithmetic should be repeatedly executed. As shown in FIG. 23, a floating-point arithmetic unit has a dedicated data register separate from a general-purpose register, and performs arithmetic using the dedicated data register. In such arithmetic, a process for transferring data stored in the general-purpose register to the dedicated register becomes overhead. For this reason, the floating-point arithmetic unit accesses directly to the data stored in the general-purpose register so as to be capable of performing the arithmetic. With such a constitution, the data transfer process from the general-purpose register to the dedicated register can be reduced and thus the processing efficiency of the arithmetic unit is improved, and since the instruction for transferring data from the general-purpose register to the dedicated register is not necessary, the code efficiency is improved.

FIG. 24 illustrates another arithmetic example using the product-sum arithmetic unit and the floating-point arithmetic unit.

After an analog signal of an external sensor or the like is digitally converted by an A/D converter and is stored in the memory 4, a filter operation is performed according to the memory-to-memory product-sum operation instruction using digitally converted sensor information stored in the memory 4 and filter operation coefficients stored in the memory 4, and a noise included in the digitally converted sensor information can be eliminated.

In motor control for supplying a PWM (Pulse Wave Modulation) waveform to a motor and controlling its rotation, after motor currents output from respective phases of the motor (U/V/W phases) are digitally converted by the A/D converter and are stored in the register, a coordinate is converted by the register-to-register product-sum operation instruction. After the floating-point arithmetic unit performs PID (proportion/integration/differential) control operation on a product-sum operated result stored in the general-purpose register, the coordinate conversion is again performed on a control operated result of the general-purpose register by the register-to-register product-sum operation instruction, and the PWM waveform is supplied as a motor control signal to the motor. Such arithmetic enables repetition of the arithmetic using the general-purpose register, thereby enabling the motor control with shorter interval than that of the arithmetic using the dedicated register.

Figure 25:
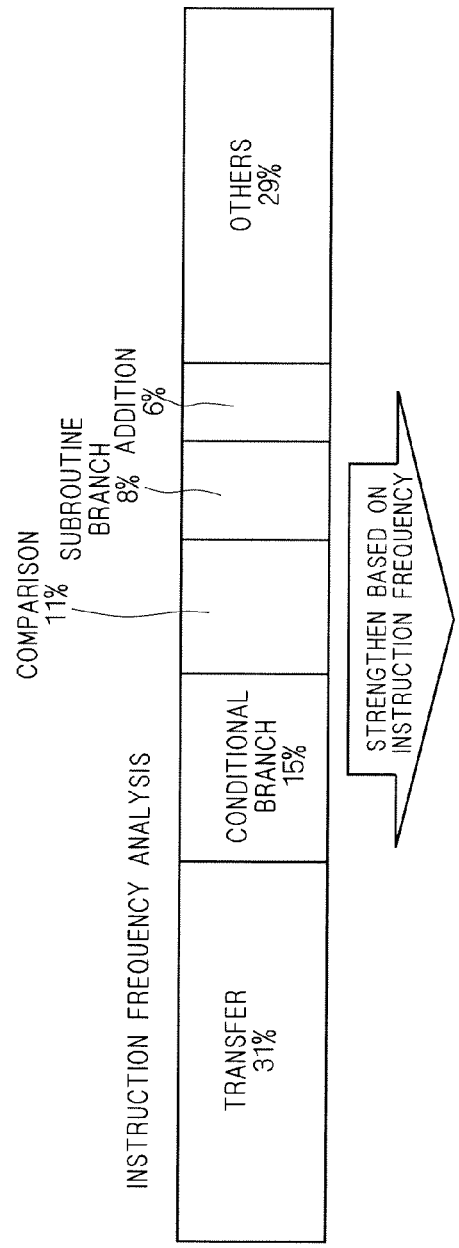
FIG. 25 is a diagram illustrating appearance frequency of an instruction appearing in the program.

FIG. 25 illustrates instructions with high appearance frequency according to an analysis of a user's application. When a size of a frequently-appearing instruction is reduced, an execution program size of the user application can be reduced, so that the code efficiency can be improved. Further, to make the instruction with high appearance frequency used by users more easily leads to an improvement in usability.

FIG. 26 illustrates one example of an instruction with high appearance frequency whose size is reduced.

In a loop process in the program and a multi-direction branch according to a value of a variable, a branch instruction to be used at the time of branching according establishment/non-establishment of a loop condition or the value of the variable includes BEQ (conditional establishment branch) for specifying an address of a branch destination by means of a relative address, BNE (conditional non-establishment branch) and BRA (unconditional establishment branch).

In these instruction operations, a distance between addresses to be branched in the memory 4 is comparatively short, and 1-byte, 2-byte and 3-byte instructions can be adopted as code sizes of the branch instruction according to branch distances of within 8 bytes, 256 bytes and 65434 bytes. As a result, the freedom degree of user's selection according to the branch distances becomes high, thereby improving the code efficiency.

In a transfer instruction in register indirect addressing for specifying a relative displacement value based on an address value stored in the register and a comparison instruction and an addition instruction for carrying out arithmetic between an immediate value and the register, the code size of the instructions can be selected from 2 bytes to 8 bytes according to a range of values specified as the relative displacement value and the immediate value based on the register stored values.

In another manner, in an arithmetic instruction for enabling specification of a data width to be used in the arithmetic in the register stored values, a code size can be selected from 2 bytes to 6 bytes in a multiplication instruction according to a range of a value that can be specified as the data width, or the code size can be selected from 3 bytes to 7 bytes in a division instruction.

Further, in a subroutine branch instruction, arithmetic of program counter storage value+ a register storage value is carried out to obtain an address of branch destination, so that the code size of the instruction can be selected from 2 to 4 bytes.

FIG. 27 illustrates an example of the register indirect addressing with index.

In the register indirect addressing with index, addition is executed between the register for storing a base address and the register for storing an offset address, and data is transferred to the obtained address. In this case, when a byte size is specified, the offset address is directly added to the base address, and when a long-word size is specified, a value obtained by quadruplicating the offset address is added to the base address. Adopting of such addressing specification can reduce the instruction for adding the offset address and the base address in byte size specification, and a quadruplicating arithmetic (2-bit left-shift arithmetic) instruction for the offset address and an instruction for adding the offset address and the base address in the long-word size specification, thereby improving the code efficiency.

FIG. 28 illustrates an example of the register indirect addressing with a post-increment/pre-decrement function.

The post-increment/pre-decrement is used for a case where arithmetic is carried out on values stored in a table having a predetermined number of entries. As to the use of the post-increment or the pre-decrement, when the arithmetic is carried out from a low-side address in the table, the post-increment is used, and when the arithmetic is carried out from a high-side address in the table, the pre-decrement is used. When the arithmetic is carried out from the low-side address in the table, after the arithmetic is carried out on a value stored in a first table entry, an address for referring to a value of a next table entry should be added. According to the post-increment/pre-decrement function, addition/subtraction of addresses for referring to the table entries can be carried out by an arithmetic instruction for performing the arithmetic on the values stored in the table entries, the instruction for the addition/subtraction of reference addresses can be reduced, thereby improving the code efficiency.

Figure 29:
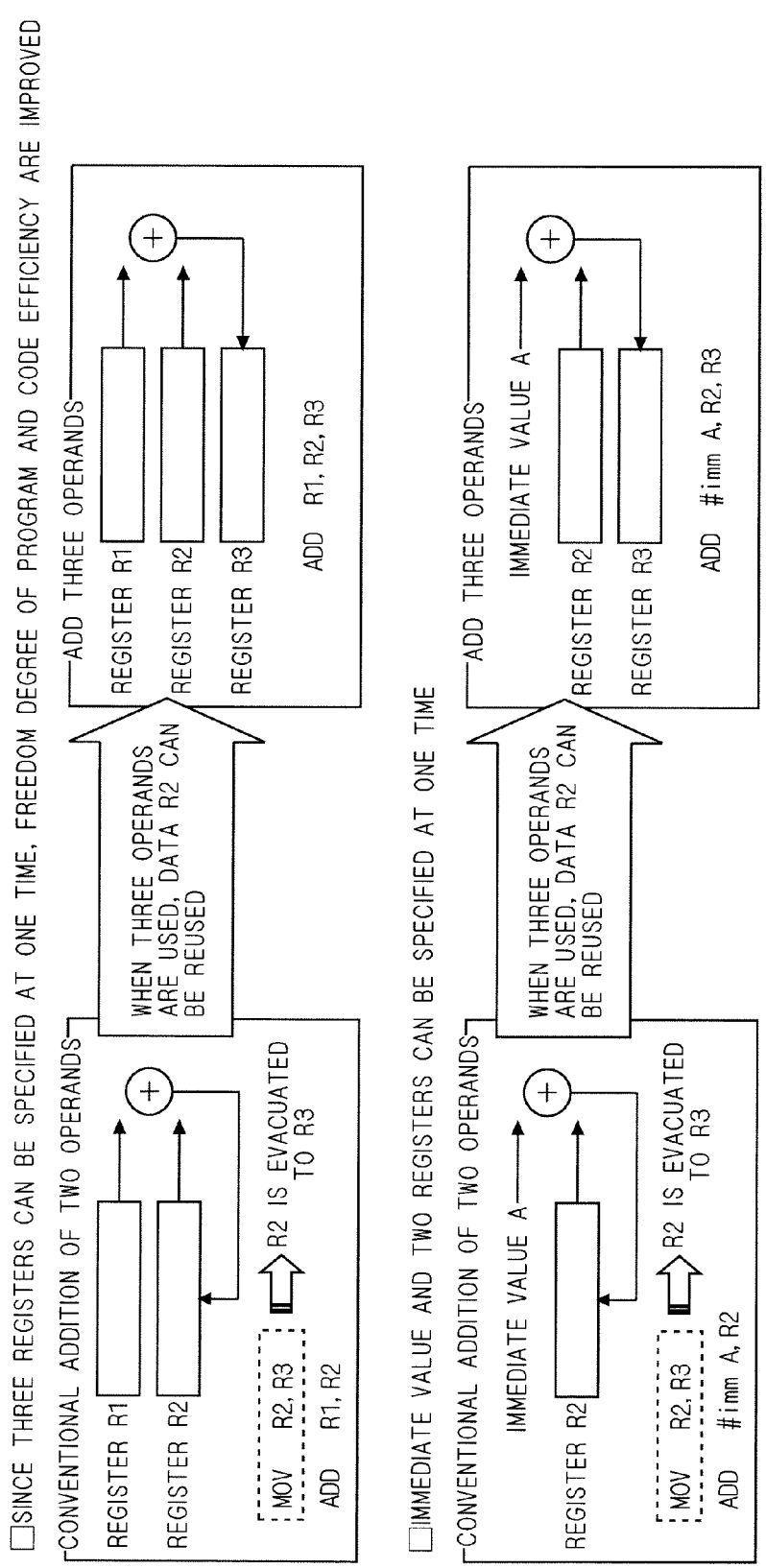
FIG. 29 is a diagram illustrating arithmetic in three-operand specification.
Figure 30:
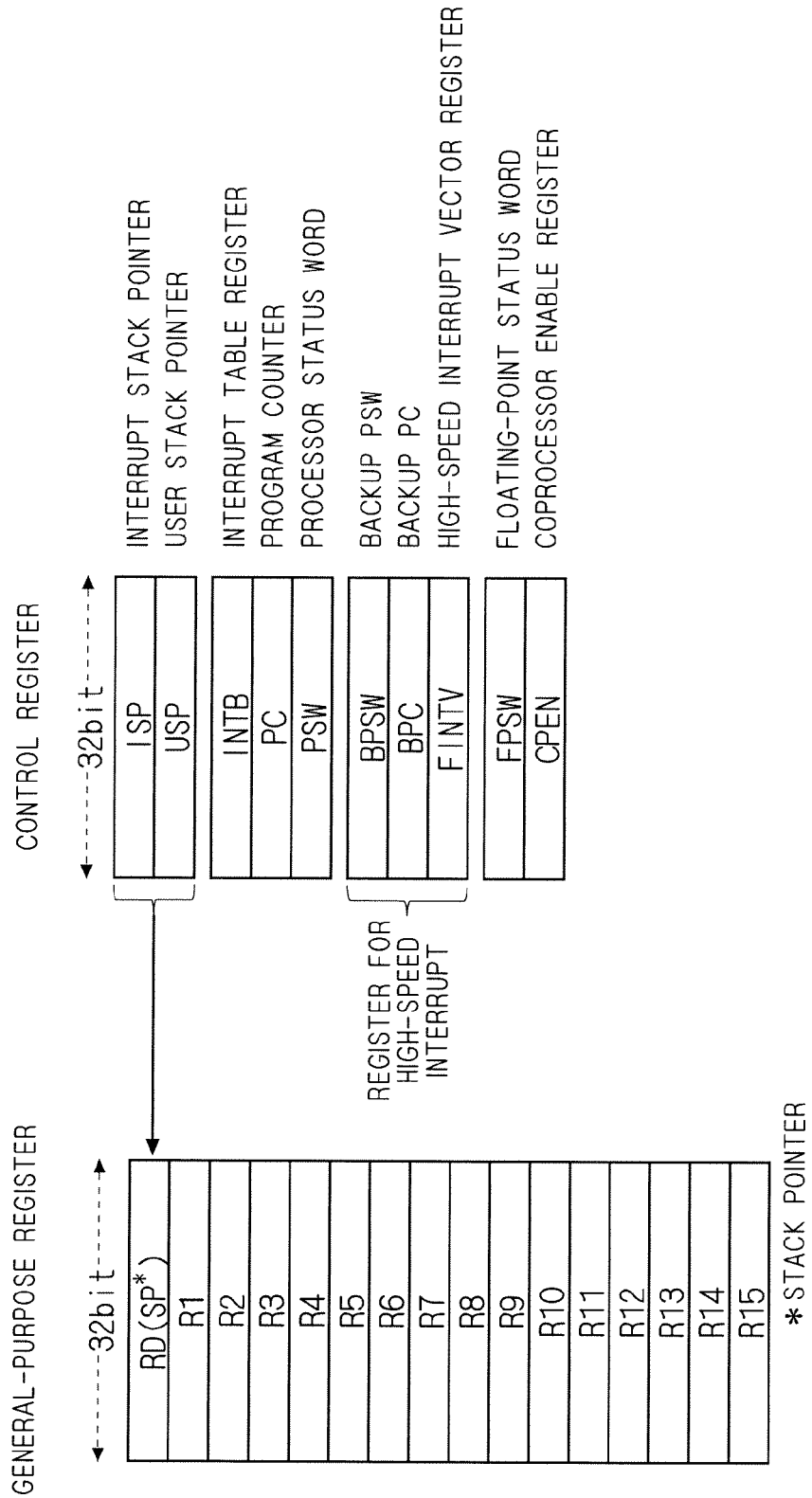
FIG. 30 is a diagram illustrating one example of a register constitution in the microcomputer.

FIG. 29 illustrates an example of the arithmetic where three operands can be specified.

When the addition instruction where two registers or the like are specified as operands is executed, an additional value and a value to be added are stored in the respective registers, and the added result is stored in the register that stores the value to be added. In such an arithmetic operation, when the value to be added is used also for another arithmetic, this value is stored in another register or the memory 4, and the value to be added should be transferred to a value-to-be-added storage register at every time of arithmetic.

When three operands can be specified by the register or the like, the arithmetic result can be specified to be stored in a register different from the value-to-be-added storage register, and the instruction for transferring the value to be added to the value-to-be-added storage register at every time of the arithmetic can be reduced, thereby improving the code efficiency.

FIG. 23 illustrates an example of a register constitution of the microcomputer MCU. The microcomputer MCU has a general-purpose register to be mainly used for the arithmetic, and a control register to be used for an operation control of the microcomputer MCU.

The general-purpose register is occasionally divided so as to be capable of being used as an 8-bit register and a 16-bit register to be used for arithmetic of 8-bit data and 16-bit data for a basic size (32 bits). However, in the microcomputer MCU according to this embodiment, such division of the register is not carried out, and all the registers are used only in 32 bits as a basic.

When the register is divided, since access control between a partial register that is subject to arithmetic and a partial register that is not subject to arithmetic is necessary, the register control circuit becomes complicated, thereby causing temporal overhead in the register access and an increase in the power consumption. The general-purpose register is accessed very frequently in the instruction execution, and even when the temporal overhead in the register access and the increase in the power consumption at one execution are very small, the temporal overhead and the power consumption in the entire program execution become large.

When the register division is not adopted, the temporal overhead and the power consumption in the register access can be reduced. Further, since the sizes of the general-purpose registers are uniform, the freedom degree of the register usable in the process for compiling high-level language into assembly language becomes high, and thus use efficiency of the general-purpose registers is improved, thereby reducing a frequency of an access to the memory 4. Such a point can reduce the overhead and the power consumption of the memory access in the instruction execution.

The control register has stack pointers (ISP, USP) in the interrupt process and in the subroutine process, an interrupt table register (INTB) representing an arrangement address of the interrupt table, a program counter (PC) representing an instruction address in execution, a processor status word (PSW) representing a state of the instruction execution, and floating-point status words (FPSW, CPEN) representing execution states of the floating-point arithmetic unit and the other coprocessors. Further, the control register has a backup PSW (BPSW) and a backup PC (BPC) for backing up PSW and PC, and a high-speed interrupt vector address (FINTV) in the high-speed interrupt process as dedicated registers for executing the high-speed interrupt process.

Figure 31:
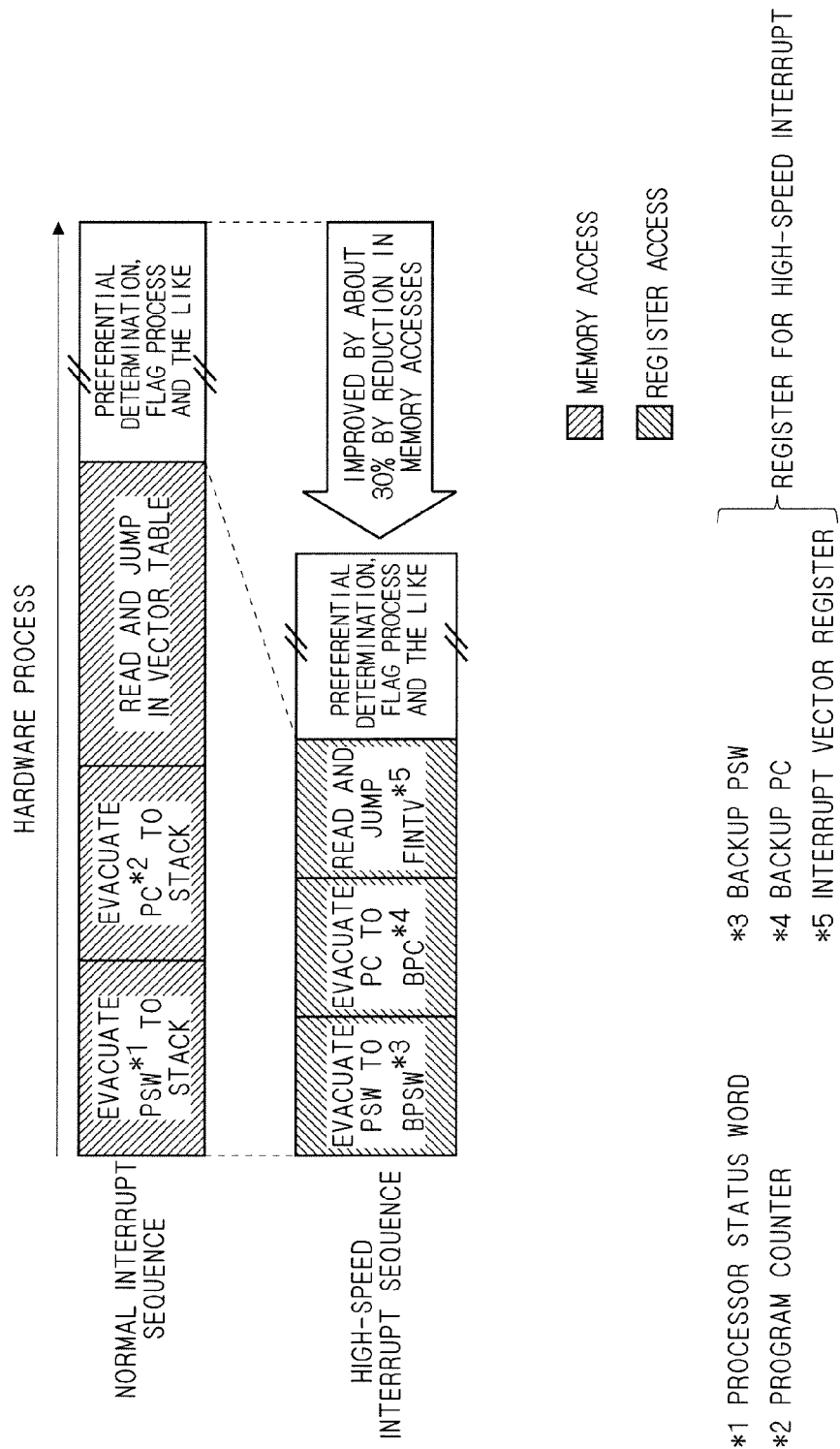
FIG. 31 is a diagram illustrating one example of speeding-up of an interrupt process.
Figure 32:
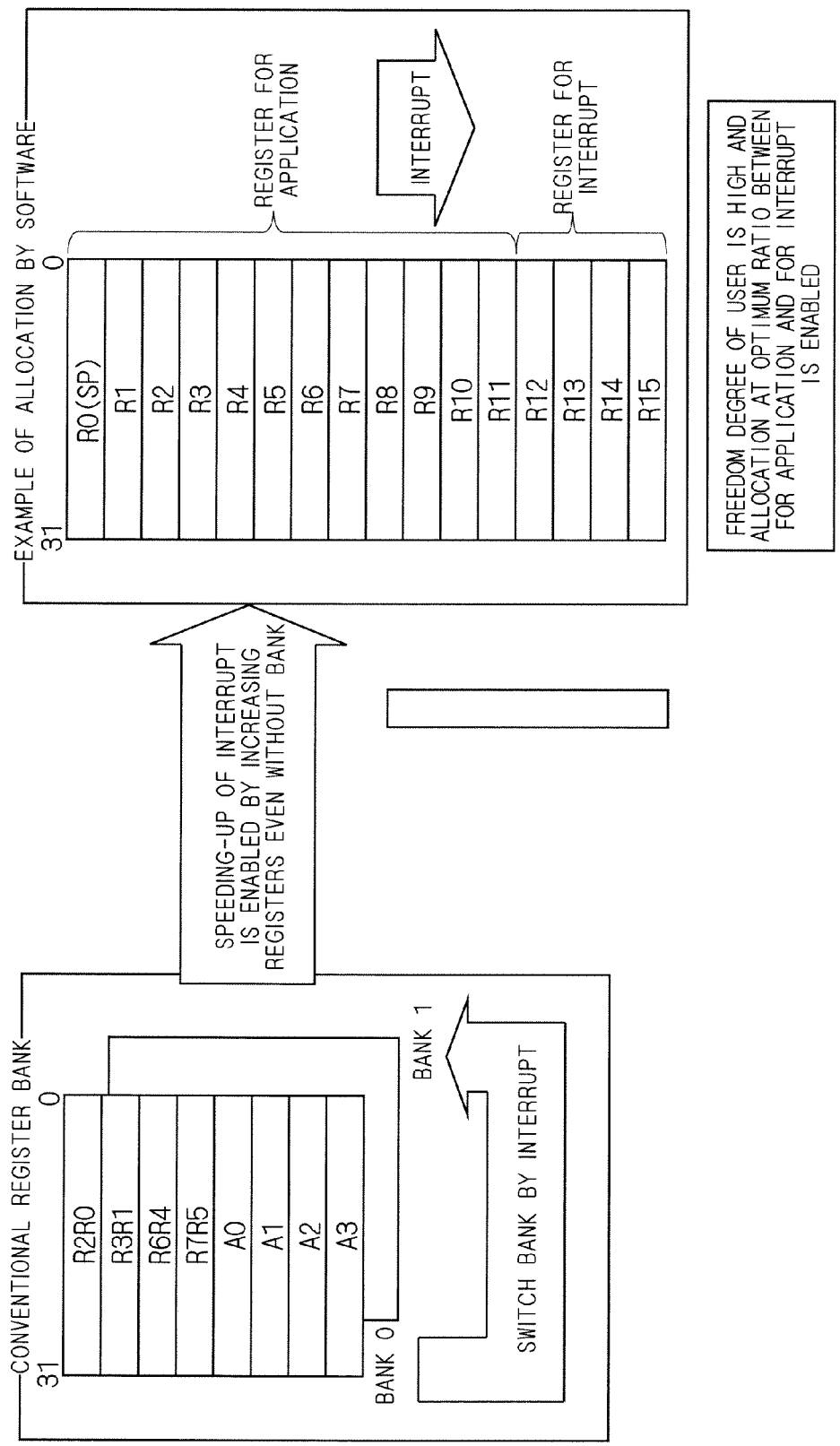
FIG. 32 is a diagram illustrating a use example of the register in a high-speed interrupt process.
Figure 33:
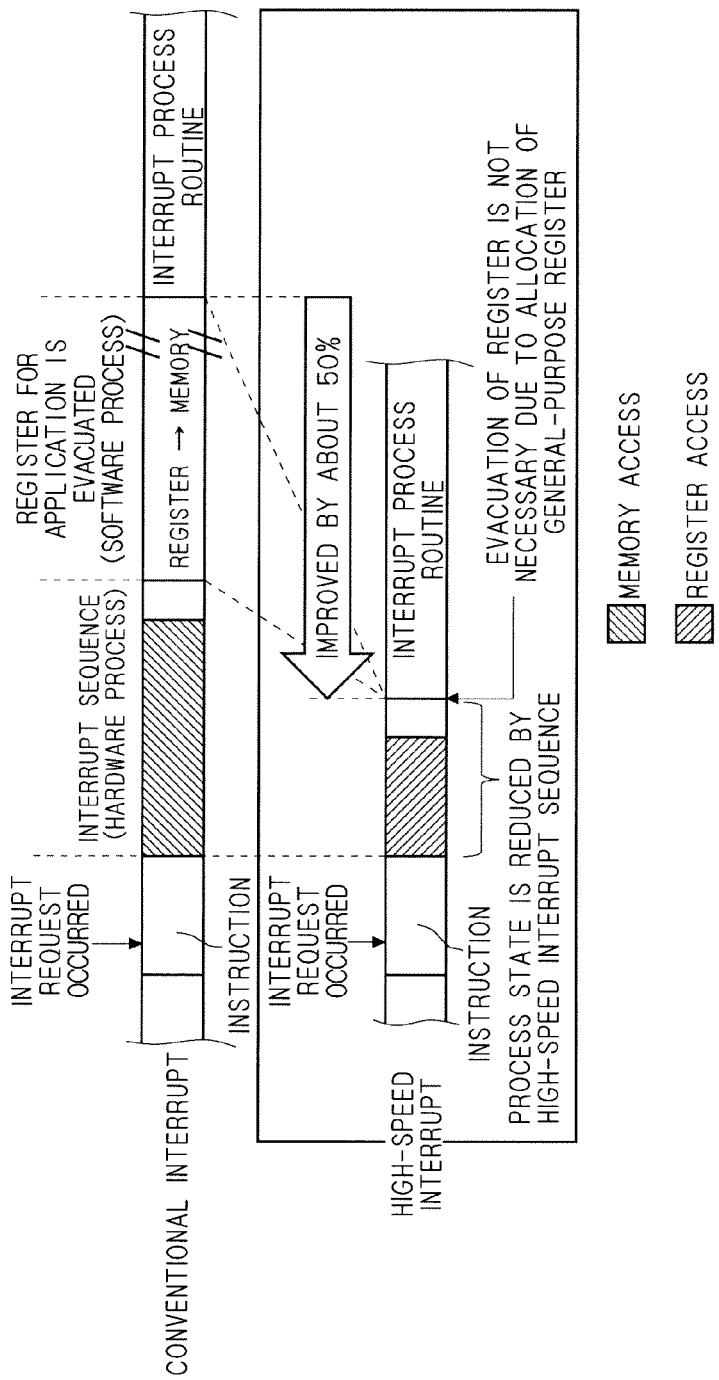
FIG. 33 is a diagram illustrating a time up to starting of the interrupt process in the high-speed interrupt process.

FIGS. 31, 32 and 33 illustrate a case of speeding-up of the interrupt process.

FIG. 31 illustrates a sequence of the high-speed interrupt process. In the normal interrupt process, PSW and PC are evacuated to stack regions, respectively, according to an interrupt acknowledgment from the interrupt controller INTC, reading from the vector table is carried out according to an interrupt factor, and an address of the interrupt process routine is obtained so that branch into the interrupt process routine is carried out. Further, when a plurality of interrupt acknowledgments is sent or another interrupt acknowledgment is sent in a state that the interrupt process has been already executed, priorities of the interrupt processes are determined, and a flag setting process such as an interrupt mask is executed according to the interrupt processes to be preferentially executed. In these processes, since the stack region and the interrupt vector table are allocated to the memory 4, time for the memory access is necessary for the evacuating of PSW and PC to the stack regions and the reading from the vector table.

In the high-speed interrupt process, PSW and PC are not evacuated to the stack regions and the access to the interrupt vector table is not carried out, but they are evacuated to the backup PSW and the backup BPC that are prepared as the control registers, and the branch into the interrupt process routine stored in the high-speed interrupt vector address is carried out. Such a process can reduce the memory access in the high-speed interrupt process, so that the branch into the interrupt process can be sped up.

FIG. 32 illustrates allocation of the general-purpose register in the interrupt process. In the normal interrupt process, evacuating data stored in the general-purpose register into the stack region or switching a register bank, which is used for the branch into the interrupt process, into a different bank is carried out so that inconvenience, which is caused by rewriting data stored in the general-purpose register used in the application before the branch into the interrupt process during the interrupt process, does not occur in the continuous execution of the application after return from the interrupt process. The evacuation to the stack region generates a memory access, and switching of register bank is realized by actually evacuating the data stored in the register to the region of the memory 4.

In order to speed up the branch into the interrupt process, the general-purpose register is allocated to the register for application and the register for interruption, and a control is made so that the register allocated for application is used during the execution of the application and the register for interruption is used during the execution of the interruption process. When the allocation to the register for the application and the register for the interruption process can be set by a program, the freedom degree of the allocation of the register is heightened, and since the evacuation of the general-purpose register is not necessary, the starting of the execution of the interrupt process can be sped up.

As shown in FIG. 33, by reducing the memory access in the evacuation of PSW and PC and in obtaining of the interrupt vector address (high-speed interrupt process) and switching the general-purpose register from the register for application into the register for interruption (allocation of the general-purpose register), the time up to starting of the interrupt process according to the interrupt acknowledgment after interruption is acknowledged is shortened, and the program executing efficiency of the microcomputer MCU can be improved.

Figure 34:
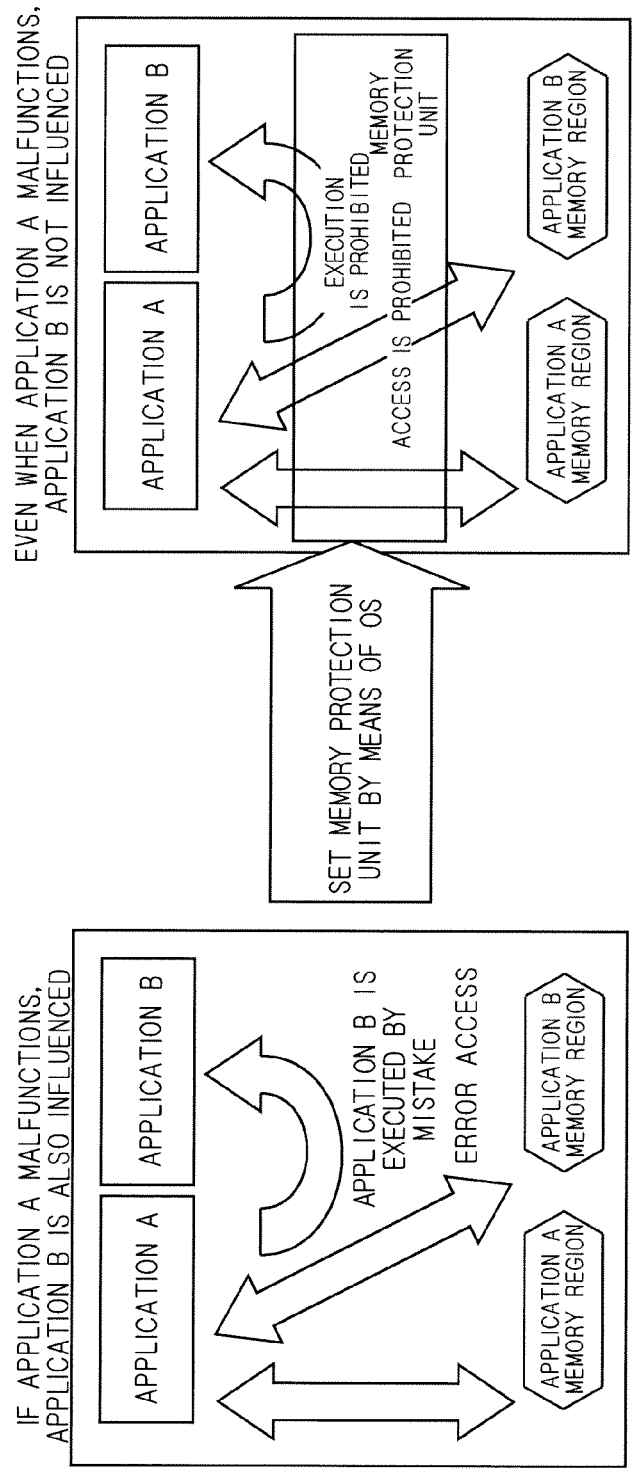
FIG. 34 is a diagram illustrating an outline of a function of memory protection.

FIG. 34 illustrates memory protection. In the case where an application A and an application B are allocated to a memory region for the application A and a memory region for the application B respectively, when an access by the application A to the memory region for the application B to rewrite data to be used in the application B by mistake, a branch from the application A into the application B by mistake, or the like occurs, an executing operation of the application B becomes unstable, and thus the entire operation of the microcomputer MCU also becomes unstable.

In order to prevent such a circumstance, a memory protection unit is provided so as to prevent the application A from accessing to the memory region for the application B, the application A from being branched to the application B and the like. As a result, the executing operation of the application B is prevented from being unstable, and thus the entire operation of the microcomputer MCU can be made to be stable.

FIG. 35 illustrates an example of an endian converting instruction.

The bi-endian process for data according to the embodiments 3 and 4 is described, but after data, that is stored in the memory region where the data is processed as little endian, is read into the general-purpose register and predetermined arithmetic is carried out, the data is occasionally transferred to the memory region where the data is processed as big endian or to the peripheral I/O device for big endian. In this case, the control signal CNT1 to the aligner 11 or the control signal CNT2 to the aligner 13 is set so that the sequence of the data in the aligner 11 or 13 can be changed. When data is converted continuously to a certain extent, the change in the data sequence is made to be effective by the aligner 11 or 13.

On the other hand, when data is changed alternatively between little endian and big endian so as to be stored in the memory region, the aligner 11 or 13 should be set so that the endian is converted alternatively. In such a case, endian of data in the register is converted according to the endian converting instruction, and the setting of the aligners 11 and 13 is not changed, so that power consumption relating to the change in the setting of the aligner 11 or 13 can be occasionally reduced.

Figure 36:
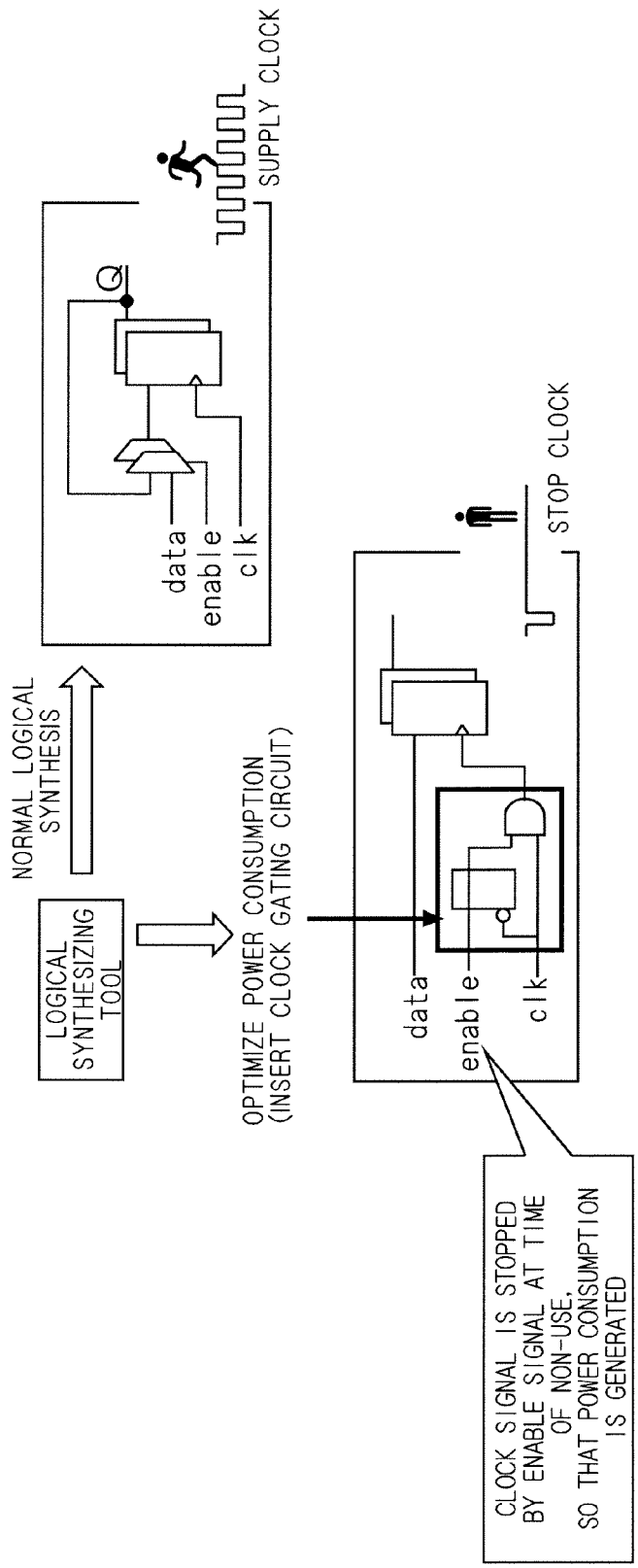
FIG. 36 is a diagram illustrating an outline of a clock gating design.
Figure 38:
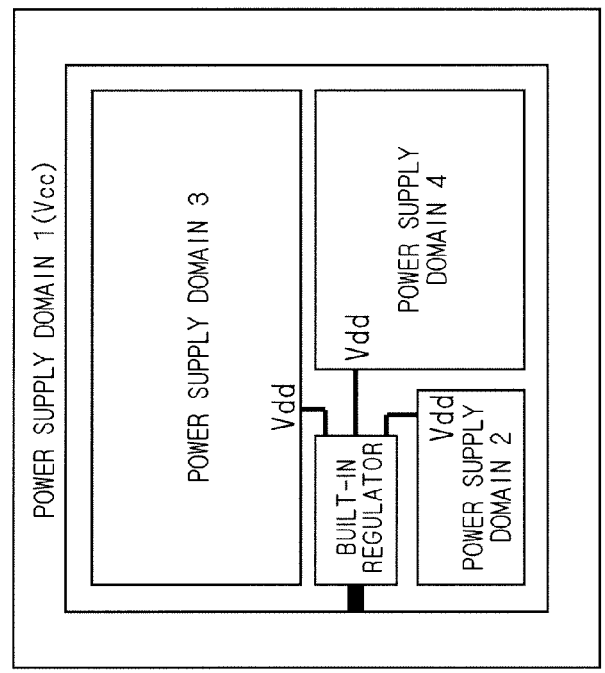
FIG. 38 is a diagram illustrating an outline relating to power supply domain division.

FIGS. 36, 37 and 38 illustrate examples of a designing method that realizes low power consumption of the microcomputer MCU.

Since an electric current is applied to a logical element that operates in synchronization with a clock such as a flip-flop and to a clock driver that is arranged on a clock supply route as long as a clock is supplied, the supply of the clock to a circuit that is not used should be stopped. For this reason, as shown in FIG. 36, a clock gating circuit is inserted at the time when a logic synthesis of the microcomputer MCU is performed, thereby stopping the clock supply.

In a clock synchronization design, when the logic element that operates asynchronously with a clock is arranged so as to sandwich the flip-flop that operates in synchronization with a clock, a route where timing violation occurs between the flip-flops (critical path) is generated, and thus such timing violation should be solved. As shown in FIG. 37, the clock synchronization is designed first by using a low-speed logical element of high threshold voltage/low leak current, and a high-speed logical element of low threshold voltage/high leak current is used only for the critical path, so that timing violation is solved. When such clock synchronization is designed, a lot of logical elements composing the microcomputer MCU become logical elements of low power consumption, and a higher-speed logical element of higher power consumption is used on a route where timing violation occurs for the low-power consumption logical element, so that the clock synchronization of the microcomputer MCU with entirely low power consumption can be designed.

Further, as shown in FIG. 38, the inside of the microcomputer MCU is divided into a plurality of power-supply domains, and a plurality of low power consumption mode is provided so that the power supply to the power supply domains that do not operate is stopped. In this case, a built-in regulator in the microcomputer MCU supplies power to the respective power supply domains, and a switch circuit for supplying or stopping power to the power supply domains is arranged between the built-in regulator and the power supply domains.

Figure 39:
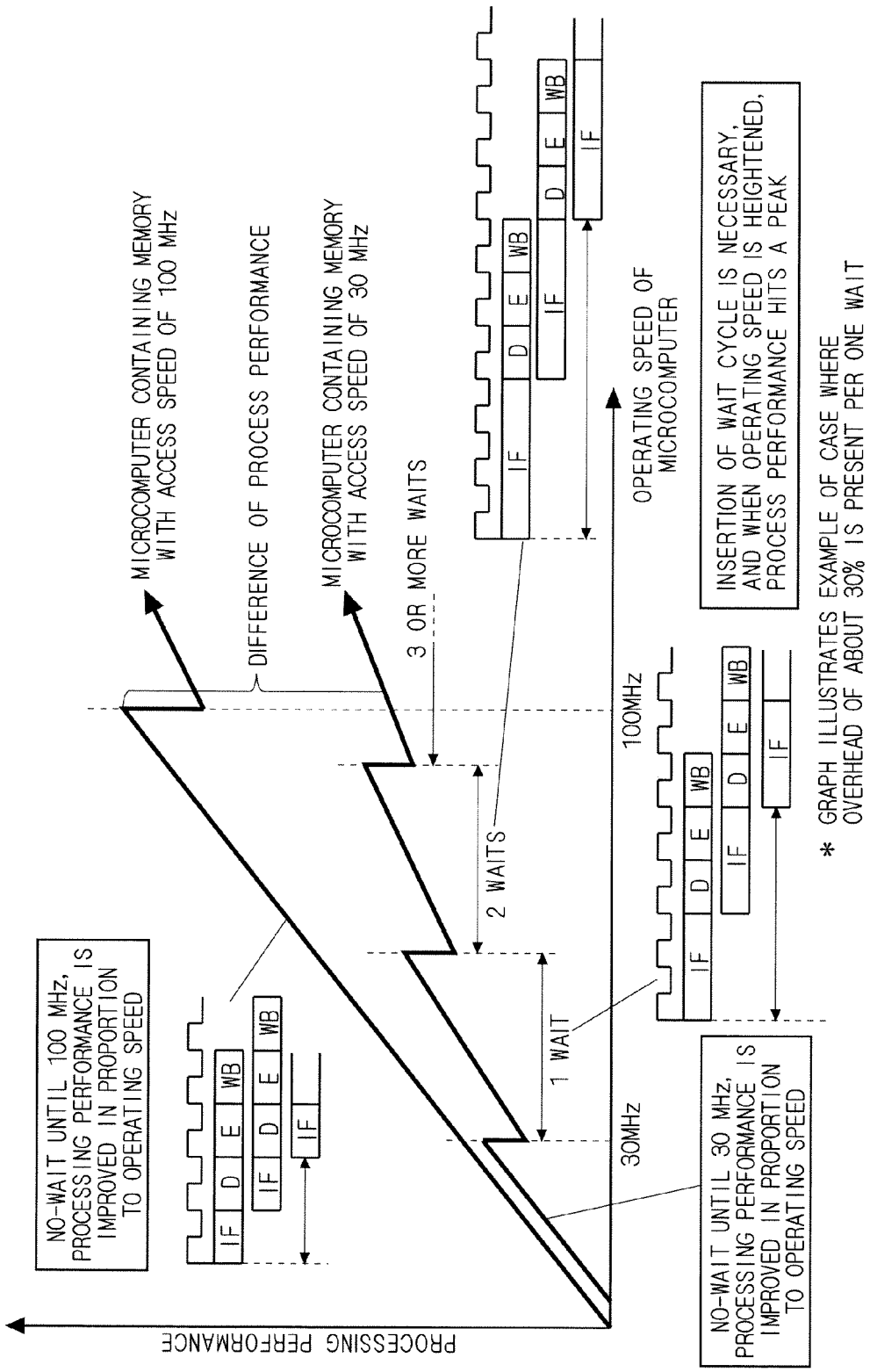
FIG. 39 is a diagram illustrating an outline of a processing performance in a case where a flash memory is used in the microcomputer.

FIG. 39 is a diagram illustrating an influence to be exerted on the processing performance of the microcomputer MCU by an access speed of a flash memory when the flash memory is used as a ROM for storing programs. When the flash memory on which the reading operation can be performed at 30 MHz is used in the microcomputer MCU, even if the microcomputer MCU is operated by a clock of 100 MHz, a wait operation with a plurality of clock cycles is necessary for every instruction fetch, and thus an effective executing performance of the program is greatly reduced from 100 MHz.

In order to avoid reducing the executing performance, it is considered that an instruction cache memory is arranged between the flash memory and the CPU 1. In the arrangement of the instruction cache memory, when the CPU 1 fetches an instruction stored in the instruction cache memory (cache hit), the instruction can be fetched at one clock cycle, but when the instruction is not stored in the instruction cache memory (cache mishit), a wait operation at a plurality of clock cycles is required, so that an area occupied by the instruction cache memory is required.

A memory array constitution of the flash memory and speeding-up of a peripheral logical circuit such as the address decoder enable, the flash memory to be operated at 100 MHz, and the CPU 1 can be operated at every clock cycle without the instruction cache memory. Further, even when the operating clock of the microcomputer MCU is further sped up, a number of clock cycles of wait at the time of occurrence of the cache mishit can be reduced.

It goes without saying that the constitutions, functions, the operations and the like of the microcomputer MCU and the CPU 1 described in the embodiment 6 can be applied to the microcomputer MCU and the CPU 1 according to the embodiments 1 to 4.

The embodiments of the present invention are disclosed and described in detail above, but the above description illustrates the aspects of the present invention that can be applied, and the present invention is not limited to them. That is to say, various corrections and modifications of the described aspects can be considered without departing from the range of the present invention.

DESCRIPTION OF REFERENCE SYMBOLS

1: CPU
2: address bus
3: data bus
4: memory
5: instruction bus
9: register
11 and 13: aligner
14: peripheral data bus for big endian
17: peripheral data bus for little endian
BSC: bus controller
INTO: interrupt controller
PC: program counter
IR: instruction register
iDec: instruction decoder

The invention claimed is:

1. A semiconductor integrated circuit device, comprising:
a central processing unit (CPU);
a bus; and
an aligner arranged between the CPU and the bus, wherein
the CPU obtains an instruction code from a memory via the bus and performs an operation according to the instruction code, and obtains data necessary for performing the operation according to the instruction code,
the instruction code is stored in the memory by any determined one endian of little endian or big endian, and the data includes vector address information represented by N bits (N=8×k: k is a positive integer that is two or more) providing an address of an instruction code to be fetched by the CPU, and a determination is arbitrarily made whether the data is stored in the memory by the little endian or the big endian,
when a data access is carried out by an N-bit length, the aligner supplies the data to the CPU in a byte order stored in the memory regardless whether the data is stored by the little endian or the big endian,
when the CPU accesses the vector address information, the aligner supplies the vector address to the CPU in a byte order stored in the memory regardless whether the vector address information is stored by the little endian or the big endian, and
when a data access is carried out by a bit length different from the N bit, the aligner changes the byte order stored in the memory so as to supply the data to the CPU according to whether the data is stored by the little endian or the big endian, and regardless of whether or not a size of the data is the same as a size related to the vector address.

2. A semiconductor integrated circuit device, comprising:
a central processing unit obtaining instruction codes and performing operations according to the instruction codes, the central processing unit obtaining vector address represented by N bits (N=8 ×k: k is a positive integer that is two or more) from a vector table to fetch an instruction code specified by the vector address;

a bus coupled to a memory; and an aligner coupled to the central processing unit and the bus, the aligner supplying data to the central processing unit in a byte order stored in the memory via the bus regardless of whether the data is stored in a little endian or a big endian when the central processing unit executes a data access in an N bits length, the aligner supplying the data to the central processing unit via the bus with changing a byte order stored in the memory according to whether the data is stored in a little endian or a big endian when the central processing unit executes a data access in a bit length different from the N bits, and the aligner supplying the vector address to the central processing unit in a byte order stored in the memory via the bus regardless whether the vector address is stored in the little endian or the big endian, and regardless of whether or not a size of the data is the same as a size related to the vector address.

3. The semiconductor integrated circuit device according to claim 2, wherein all instruction codes to be executed by the central processing unit are fixed to same endian as one of a big endian and a little endian.

4. The semiconductor integrated circuit device according to claim 3, further comprising another bus, which is distinct from the bus transmitting the instruction codes to the central processing unit.

5. The semiconductor integrated circuit device according to claim 2, wherein a bit length of the bus is N bits, and the aligner supplies the data to the central processing unit via the bus with changing a byte order stored in the memory according to whether the data is stored in a little endian or a big endian when the central processing unit executes a data access in each of N/2 bits length and N/4 bits length.

* * * * *